US006822427B2

(12) United States Patent
Wittenbreder

(10) Patent No.: US 6,822,427 B2
(45) Date of Patent: Nov. 23, 2004

(54) CIRCUITS AND CIRCUIT ELEMENTS FOR HIGH EFFICIENCY POWER CONVERSION

(75) Inventor: Ernest H. Wittenbreder, Flagstaff, AZ (US)

(73) Assignee: Technical Witts, Inc., Flagstaff, AZ (US)

( * ) Notice: Subject to any disclaimer, the term of this patent is extended or adjusted under 35 U.S.C. 154(b) by 183 days.

(21) Appl. No.: 10/137,908

(22) Filed: May 1, 2002

(65) Prior Publication Data

US 2003/0205990 A1 Nov. 6, 2003

(51) Int. Cl.[7] .............................................. G05F 1/56
(52) U.S. Cl. ....................... 323/282; 323/222; 323/351
(58) Field of Search ........................................ 323/222

(56) References Cited

U.S. PATENT DOCUMENTS

| | | | | |
|---|---|---|---|---|
| 5,477,131 A | * | 12/1995 | Gegner | 323/222 |
| 5,552,695 A | * | 9/1996 | Schwartz | 323/271 |
| 5,880,940 A | * | 3/1999 | Poon | 363/20 |
| 5,959,438 A | * | 9/1999 | Jovanovic et al. | 323/222 |
| 6,198,260 B1 | * | 3/2001 | Wittenbreder | 323/271 |
| 6,252,383 B1 | * | 6/2001 | Wittenbreder | 323/222 |
| 6,411,153 B2 | * | 6/2002 | Wittenbreder, Jr. | 327/378 |
| 6,452,814 B1 | * | 9/2002 | Wittenbreder | 363/16 |
| 6,650,550 B2 | * | 11/2003 | Wittenbreder, Jr. | 363/16 |

\* cited by examiner

Primary Examiner—Jeffrey Sterrett

(57) ABSTRACT

Several novel zero voltage switching (ZVS) cells and a ZVS dc to dc transformer circuit are revealed. A U core transformer structure for use with the dc to dc transformer circuit is also revealed. An optimal gate drive circuit that achieves optimal switch timing for ZVS switches is revealed. The optimal gate drive circuit achieves optimal timing for the case in which there is sufficient energy available to drive a zero voltage transition and also for the case in which there is insufficient energy to drive a zero voltage transition providing turn on current to the switch at the minimum drain voltage of the switch. A magnetically coupled multi-phase converter cell structure is revealed which achieves reduced switch ripple current and fast transient response for multi-phase systems with three or more cells. A ZVS active reset switch drive scheme is revealed for providing zero voltage switching in bi-directional power flow converters for both directions of power flow using a single active reset circuit. A primary switching network that applies only one quarter of the input dc source voltage to a winding network connected to the switching network is revealed. The primary switching network is useful for planar magnetic circuit elements which benefit from lower applied voltages and suffer from windings with high number of turns.

9 Claims, 34 Drawing Sheets

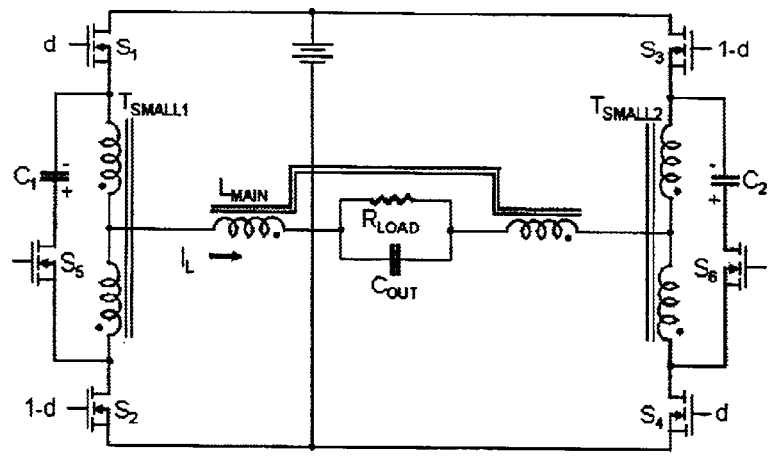
Figure 19
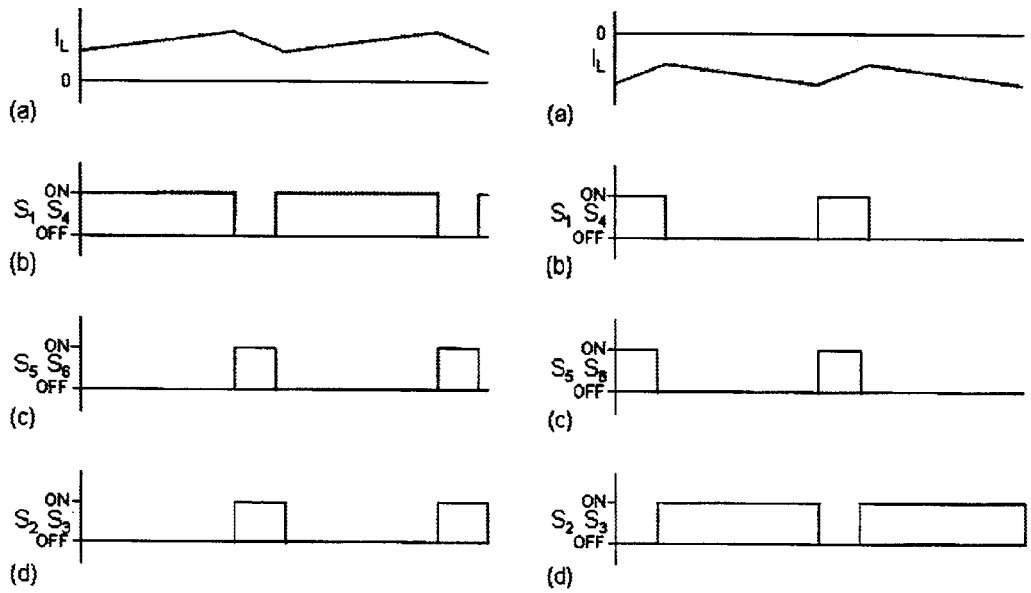
Figure 20
Figure 21

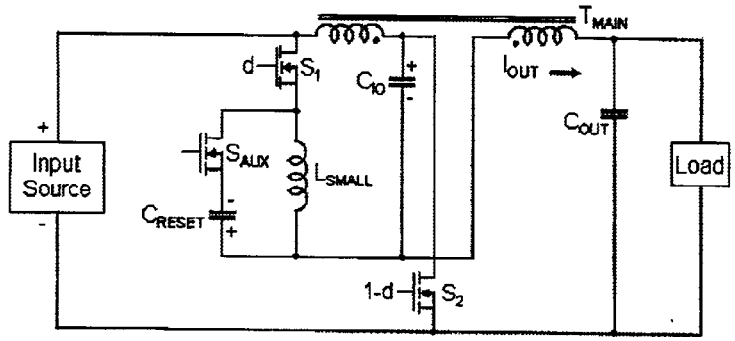
Figure 22
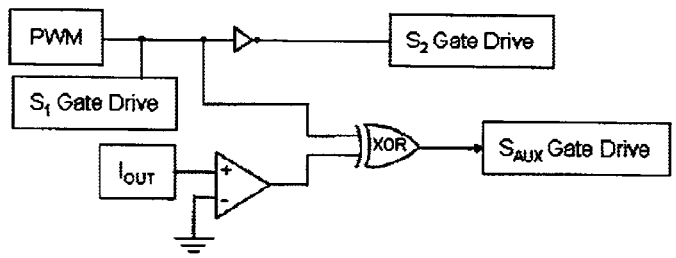
Figure 23
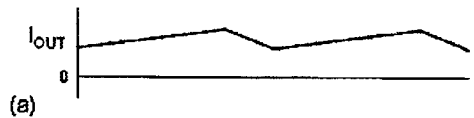
(a)
(a)
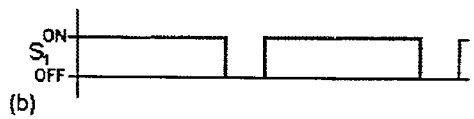
(b)
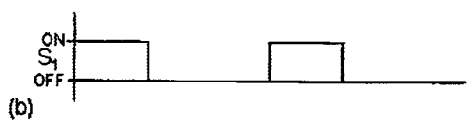
(b)
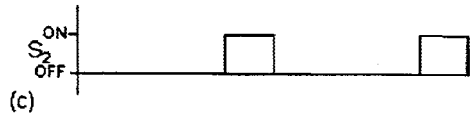
(c)
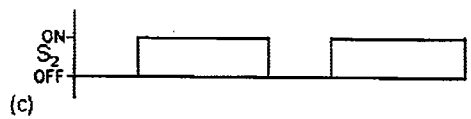
(c)
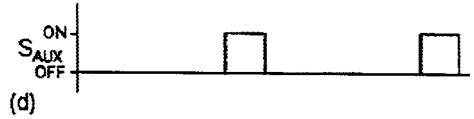
(d)
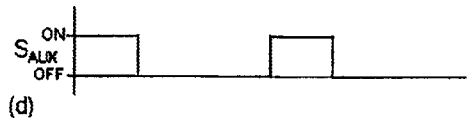
(d)
Figure 24
Figure 25

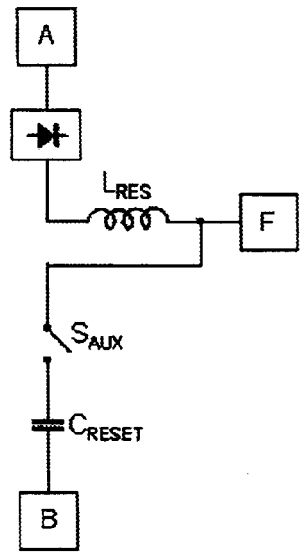
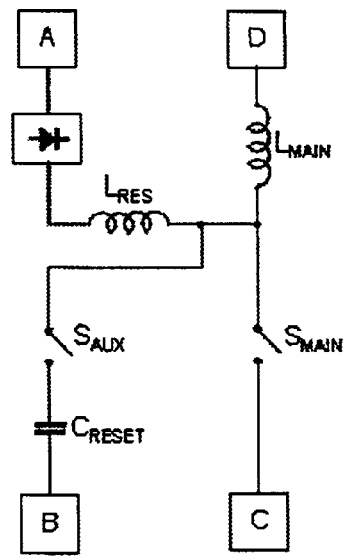

Figure 60          Figure 61

Cell Connections for Buck, Boost
or Buck Boost Converters

| Terminal | Buck | Boost | Buck Boost |
|---|---|---|---|
| A | Input Negative or Output Negative | Output Positive | Output Negative |
| B | Input Negative, Output Negative, or Input Positive | Output Positive, Output Negative, or Input Negative | Output Negative or Input Positive |
| C | Input Positive | Input Negative or Output Negative | Input Positive |
| D | Output Positive | Input Positive | Input Negative or Output Positive |

Table 1

CIRCUITS AND CIRCUIT ELEMENTS FOR HIGH EFFICIENCY POWER CONVERSION

BACKGROUND OF THE INVENTION

1. Field of the Invention

The subject invention generally pertains to electronic power conversion circuits, and more specifically to high frequency, switched mode power electronic converter circuits.

2. Description of Related Art

Several circuits have been invented that provide advantages for high frequency power conversion. At high switching frequency, transistor switching losses become a limiting factor, unless a mechanism is provided that inherently reduces or eliminates switching losses. One of these circuits, illustrated in FIG. 1, is the subject of U.S. Pat. No. 6,259,235. The FIG. 1 circuit is a zero voltage switching (ZVS) cell, which when substituted for the main rectifier in a power conversion circuit that contains a single main rectifier, provides a mechanism for driving a zero voltage turn on transition for the power converter's main switch. An example of the use of the FIG. 1 circuit in a boost converter is illustrated in FIG. 2. One minor limitation of the FIG. 2 circuit is that the auxiliary switch cannot be driven directly by a simple ground referenced circuit. Integrated circuits (ICs) exist for controlling circuits of the type illustrated in FIG. 2 in which an auxiliary switch operating in anti-synchronization to the main switch is required. The available IC controller chips provide a drive signal suitable for driving a mosfet that is referenced to ground. In order to drive the auxiliary switch of the FIG. 2 circuit either a gate drive transformer or a high side driver circuit would typically be provided. What is needed is a zero voltage switching cell that performs in a manner similar to the FIG. 1 switching cell that can be driven directly from the ground referenced drive circuits included in the available active reset controller ICs without the requirement of a gate drive transformer or a high side driver circuit.

The active reset switching cells that exist all have one trait in common, the existence of an auxiliary switch operated in anti-synchronization to a main switch and all of these include a capacitor in series with the auxiliary switch which is used to exchange energy with a small magnetic circuit element in order to reverse the direction of a current in the circuit which is used to drive a zero voltage turn on transition of a main switch. When these active reset switching cells are used in a power converter with bi-directional power flow the role of main switch in the converter changes with the direction of power flow. In one direction of power flow one switch (or pair of switches) is a main switch and another switch (or pair of switches) is a synchronous rectifier until the power flow direction reverses and then the roles of the switches reverse and what were the synchronous rectifiers become the main switches and what were the main switches become the synchronous rectifiers. In order to accomplish zero voltage switching for both directions of power flow one can use an active reset circuit for each switch. What is needed is a method that can accomplish zero voltage switching in bi-directional power flow converters with fewer switches and less circuitry. A solution with a single auxiliary switch, a single capacitor, and a single small magnetic circuit element would be ideal.

Simple isolated power converters that accomplish zero voltage switching have become well known and commercially successful. A good example of one of these, illustrated in FIG. 26, is the subject of U.S. Pat. No. 5,402,329. Improvements to these original circuits, one example of which is illustrated in FIG. 27, integrates an input filter with the active reset circuit. New circuit synthesis methods that enhance the electromagnetic compatibility of power converter circuits have been developed. These benefits improve with the number of windings available in the original circuit since the benefits largely result from putting uncoupled magnetic flux to good use. What is needed is a simple circuit similar to those cited with windings balanced on both sides of the isolation boundary.

Adaptive gate driver circuits for zero voltage switches have been invented which provide optimal timing for turn on of zero voltage switches. An example of one of these circuits is illustrated in FIG. 31. The FIG. 31 circuit senses when the voltage across the switch has dropped to zero and then immediately provides gate energy to turn on the switch. One problem associated with these zero voltage switch drive circuits is that, in many cases, there are line and load conditions in which there is insufficient energy available to drive a zero voltage turn on transition. In these cases the turn on timing is typically determined by some fixed delay. In the FIG. 31 circuit the fixed delay is determined by the $R_2$ resistor and the input capacitance of the N channel mosfet switch, but this delay may not be optimal, as illustrated in FIG. 32(b), where the delay results in the switch turning on after the switch voltage has reached a minimum and has begun to rise up above its minimum. A circuit that enables the gate drive energy at the minimum switch voltage is needed.

Coupled magnetic circuit element structures that reduce ripple currents in multi-phase interleaved power converter circuits have been invented. Originally these involved placing the windings on the outer legs of E core structures and gapping the center legs to provide a shared energy storage leg and tighter magnetic coupling between the outer leg windings. An example of such a structure, its magnetic circuit equivalent, and electrical equivalent are illustrated in FIGS. 45, 46, and 47, respectively. Until recently no similar structures applicable to more than two phases were revealed. FIG. 48 reveals a structure that shares some of the advantages of the FIG. 45 structure for 4 phases. The magnetic equivalent circuit is illustrated in FIG. 49. There are two shortcomings of the FIG. 48 arrangement. The first shortcoming results from the lack of a defined path for return flux resulting in flux returning along the full length of the top and bottom legs through the window areas. Returning flux through the window areas results in eddy current losses in the copper residing in the window areas. Another problem is the asymmetry that results in good coupling between adjacent legs, poor coupling between legs that are not adjacent, and, for practical purposes, non-existent magnetic coupling between the two outer legs. What is needed is a simpler scheme that provides better balance and symmetry for more uniform coupling and better mutual flux ripple cancellation.

OBJECTS AND ADVANTAGES

An object of the subject invention is to provide a ZVS cell that eliminates first order switching losses in all switches applicable to a wide variety of power converter types.

Another object of the subject invention is to provide a ZVS cell that can be driven directly by the commercially available active reset controller ICs without the use of any kind of high side gate drive mechanism.

Another object of the subject invention is to provide a ZVS cell that distributes the ZVS drive energy between main switch and rectifier circuits thereby creating a circuit to which known synthesis methods can be applied to achieve new ZVS circuits with enhanced electromagnetic compatibility on both sides of an isolation boundary.

Another object of the subject invention is to provide a simple active reset mechanism applicable to ZVS cells in bi-directional power flow converters.

Another object of the subject invention is to provide a gate drive circuit with optimal switch timing for both energy sufficient and energy insufficient turn on transitions.

Another object of the subject invention is to provide a ZVS dc to dc transformer circuit with a simplified low volume magnetic circuit element structure.

Another object of the subject invention is to provide a primary switch network with low winding voltage stress so that fewer primary turns are required and planar magnetic structures can be more easily accommodated.

Another object of the subject invention is to provide simple multi-phase converter cells with coupled magnetic circuit elements that achieve reduced ripple current and faster transient response.

Another object of the subject invention is to provide integrated magnetic structures suitable for use with multi-phase power converters that achieve high mutual coupling between converter phases for lower ripple current and faster transient response.

Further objects and advantages of my invention will become apparent from a consideration of the drawings and ensuing description.

These and other objects of the invention are provided by novel circuit techniques and circuit element structures.

BRIEF DESCRIPTION OF THE DRAWINGS

The present invention is illustrated by reference to the drawings.

FIG. 19 illustrates a ZVS bi-directional power flow buck converter according to the subject invention.

FIG. 20 illustrates wave forms for the FIG. 19 circuit with power flow from left to right.

FIG. 21 illustrates wave forms of the FIG. 19 circuit with power flow from right to left.

FIG. 22 illustrates a ZVS bi-directional power flow boost complement converter according to the subject invention.

FIG. 23 illustrates a simple logic circuit that generates the proper drive signal phase relationships for the circuits of FIGS. 19 and 22.

FIG. 24 illustrates wave forms for the FIG. 22 circuit with power flow from left to right.

FIG. 25 illustrates wave forms of the FIG. 22 circuit with power flow from right to left.

FIG. 60 illustrates a zero voltage switching cell according to the subject invention.

FIG. 61 illustrates a generalized converter structure based on the ZVS cell of FIG. 60.

Table 1 specifies the connections to the terminals of FIG. 61 needed to achieve ZVS forms of standard non-isolated converters.

Figure 62:
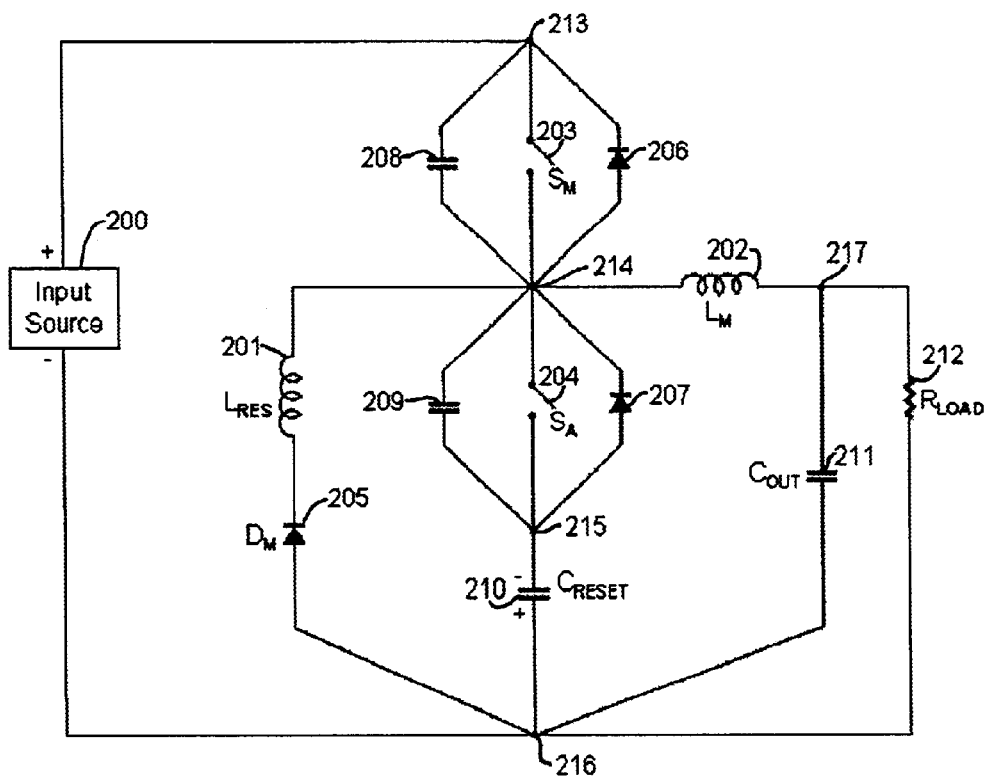

FIG. 62 illustrates a ZVS buck converter formed using the ZVS cell of FIG. 60.

Figure 63:
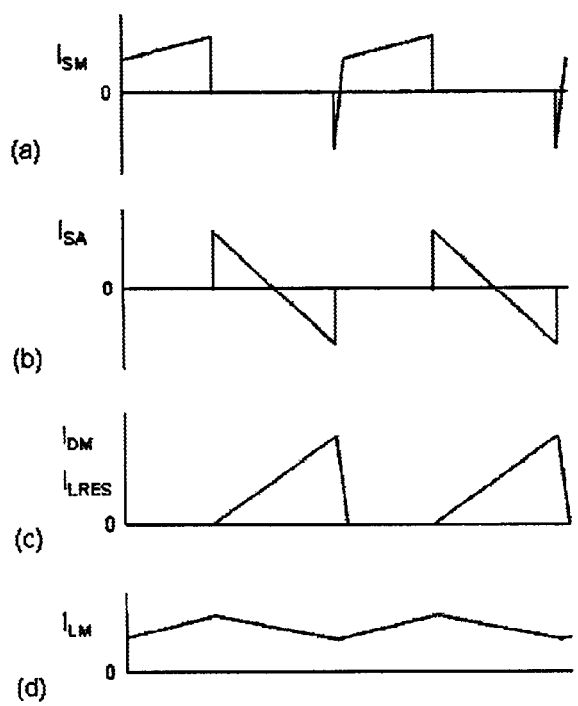

FIG. 63 illustrates wave forms of the FIG. 62 circuit.

Figure 64:
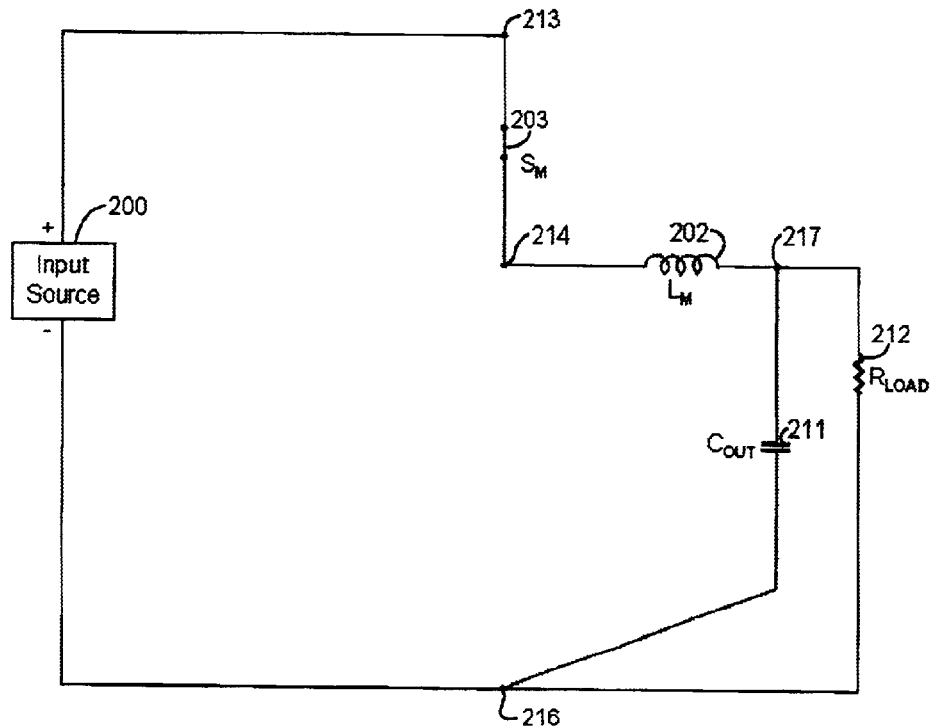

FIG. 64 illustrates an on state of the FIG. 62 circuit.

Figure 65:
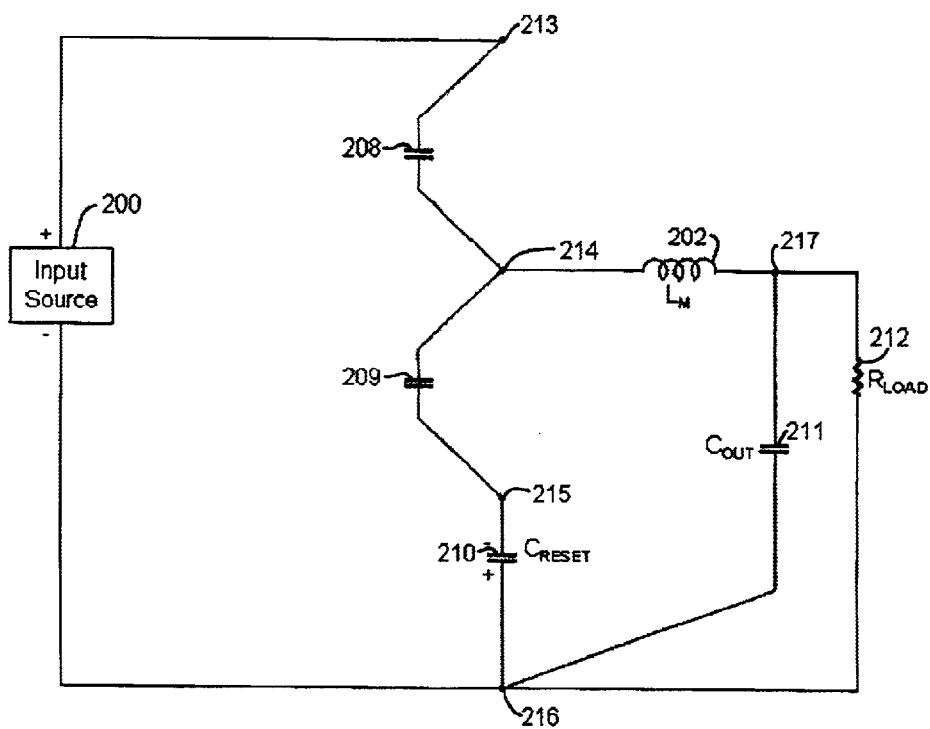

FIG. 65 illustrates a first phase of an off transition of the FIG. 62 circuit.

Figure 66:
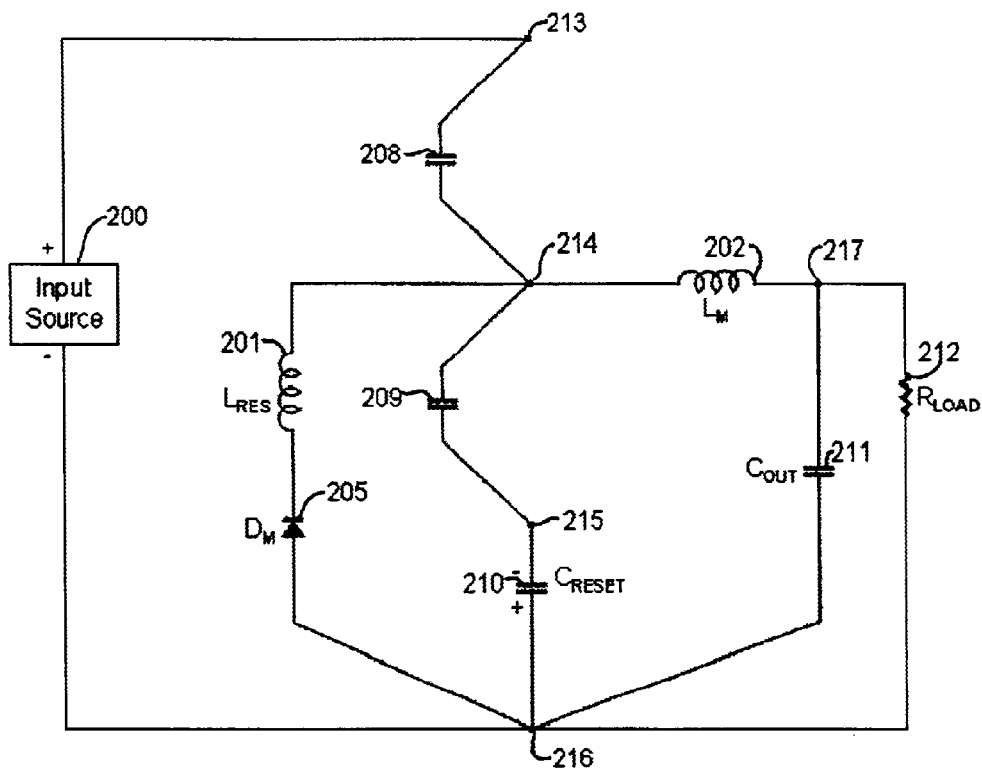

FIG. 66 illustrates a second phase of an off transition of the FIG. 62 circuit.

Figure 67:
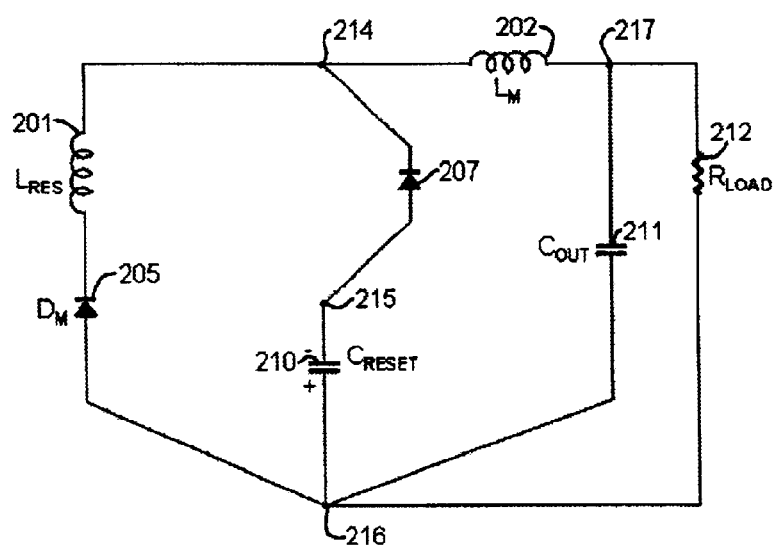

FIG. 67 illustrates a third phase of an off transition of the FIG. 62 circuit.

Figure 68:
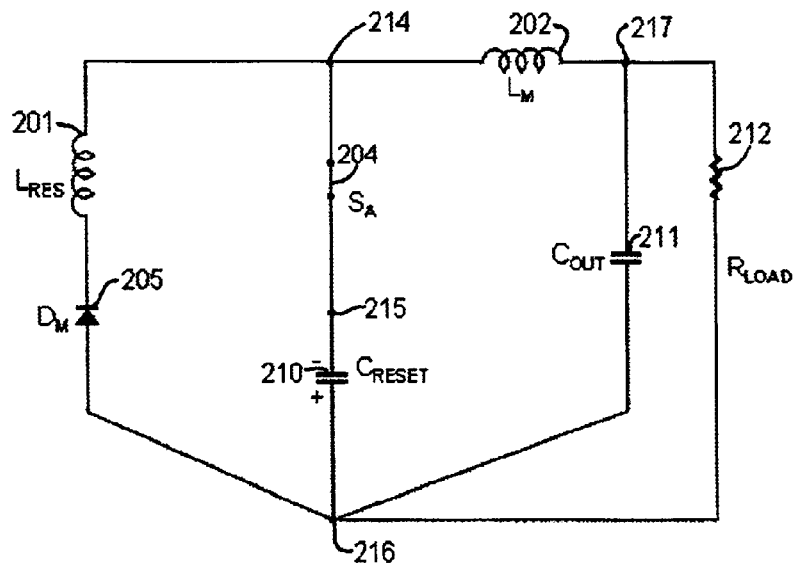

FIG. 68 illustrates an off state of the FIG. 62 circuit.

Figure 69:
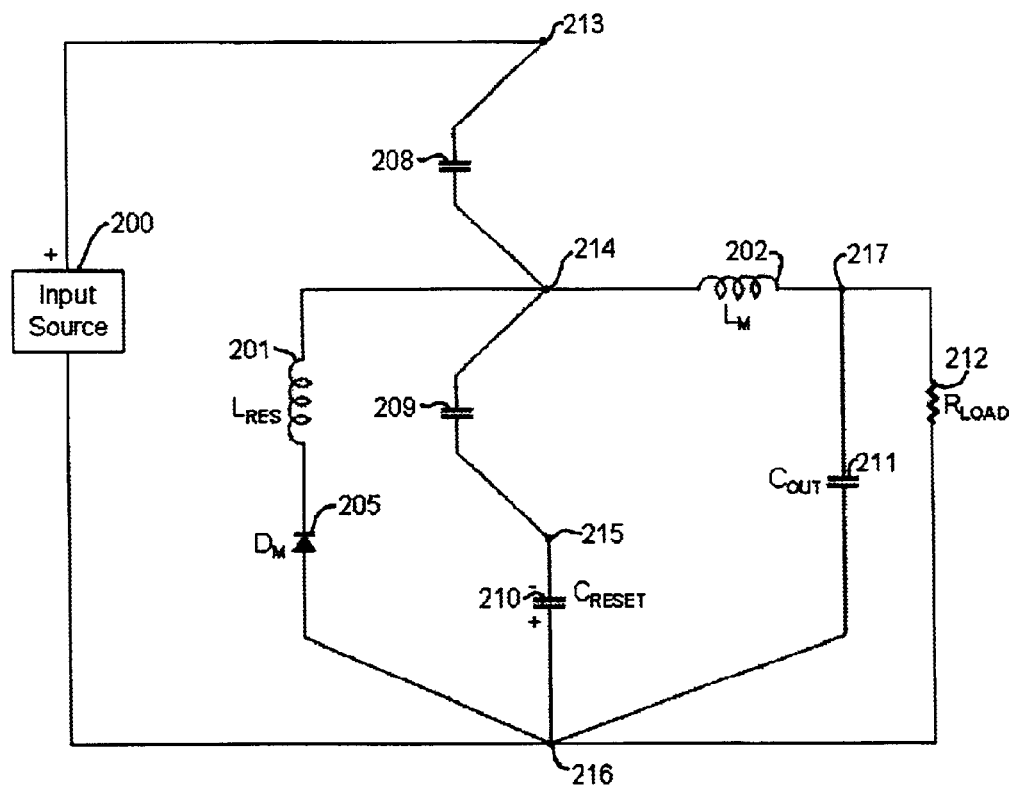

FIG. 69 illustrates a first phase of a turn on transition of the FIG. 62 circuit.

Figure 70:
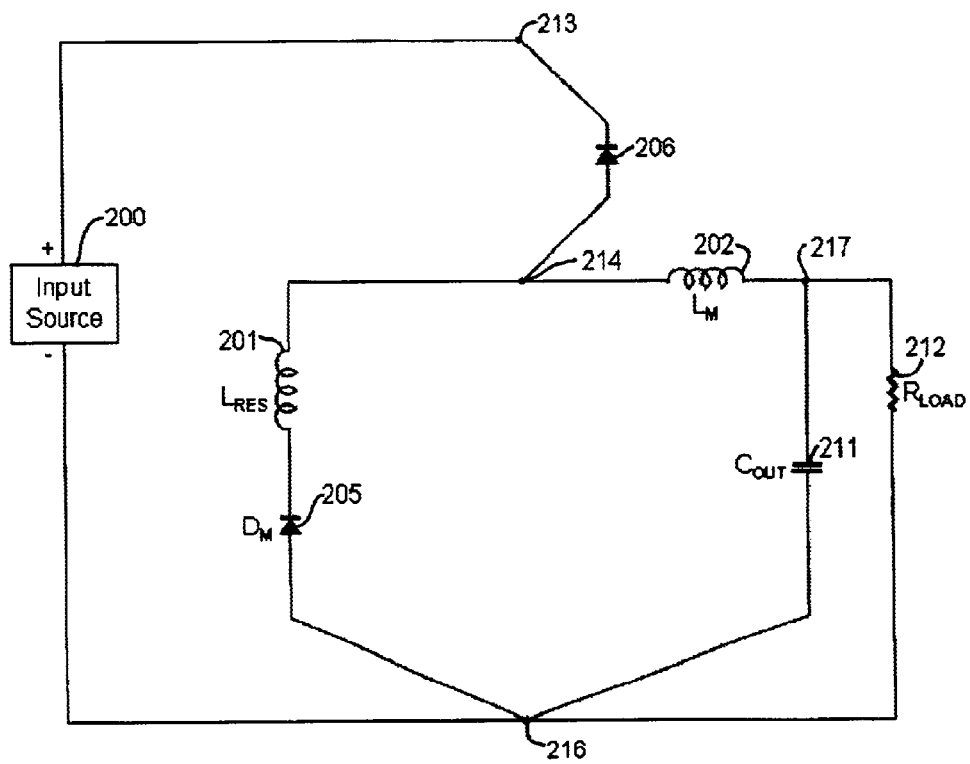

FIG. 70 illustrates a second phase of a turn on transition of the FIG. 62 circuit.

Figure 71:
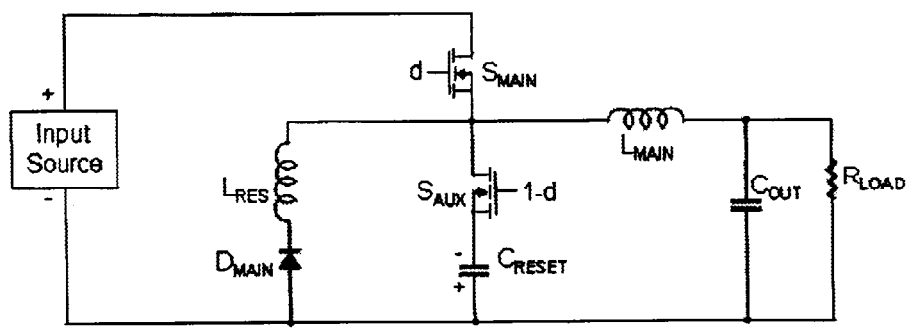

FIG. 71 illustrates a ZVS buck converter using the ZVS cell of FIG. 60 implemented using mosfets for the main and auxiliary switches.

Figure 72:
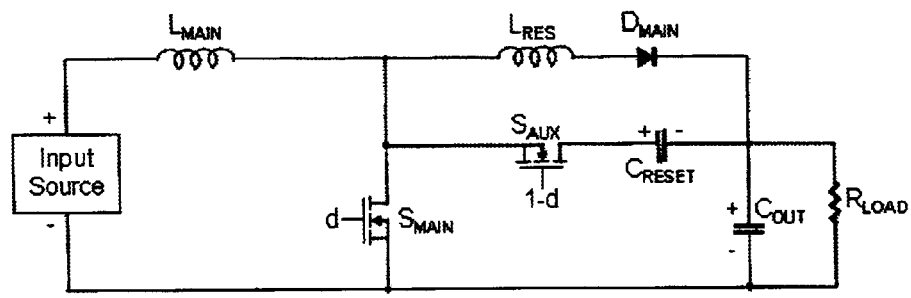

FIG. 72 illustrates a ZVS boost converter using the ZVS cell of FIG. 60 implemented using mosfets for the main and auxiliary switches.

Figure 73:
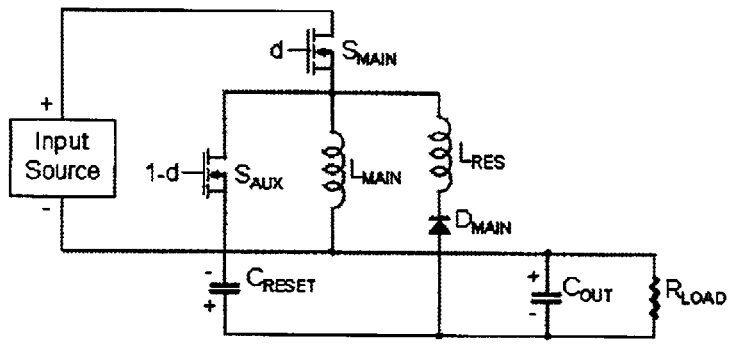

FIG. 73 illustrates a ZVS buck boost converter using the ZVS cell of FIG. 60 implemented using mosfets for the main and auxiliary switches.

Figure 74:
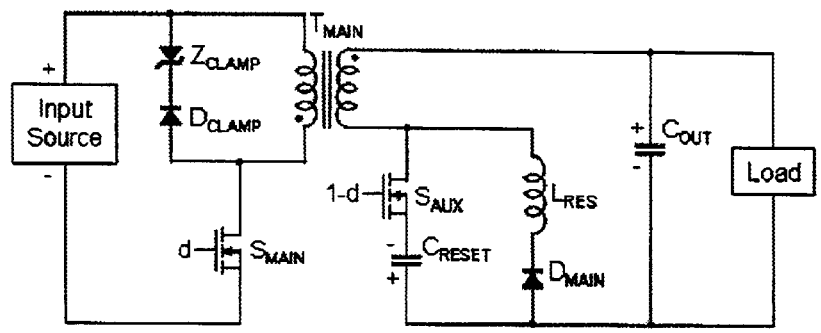

FIG. 74 illustrates a ZVS isolated flyback converter using the ZVS cell of FIG. 60 implemented using mosfets for the main and auxiliary switches.

Figure 75:
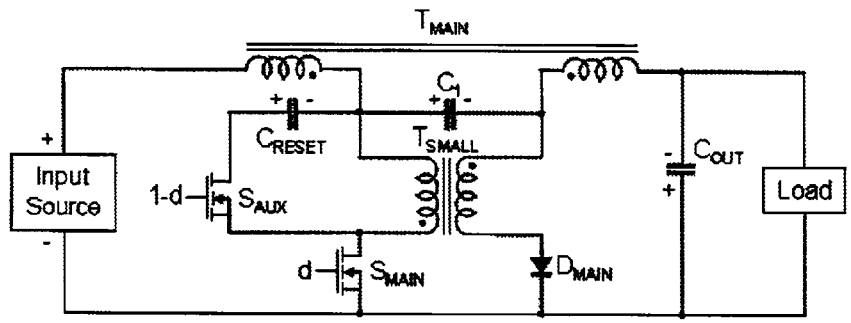

FIG. 75 illustrates a Cuk converter using the ZVS switching cell of FIG. 14(b).

Figure 29:
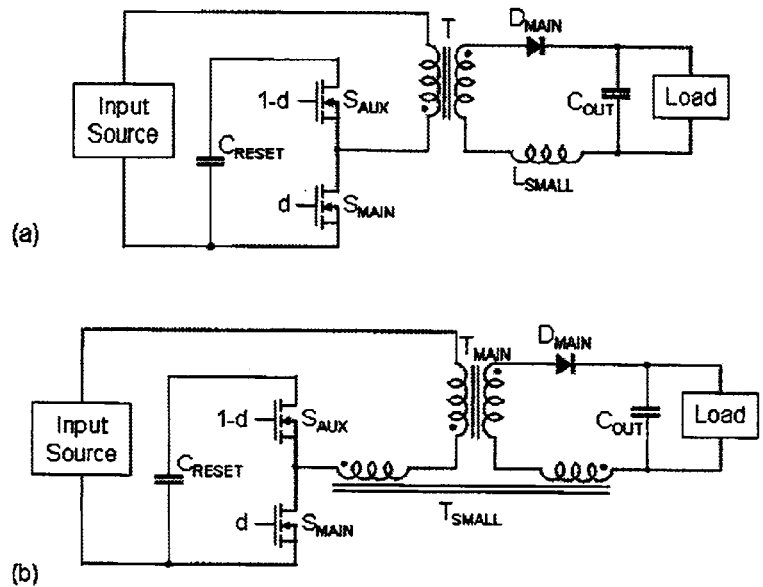
FIG. 29(a) illustrates a ZVS active clamp flyback converter with integral filter according to the subject invention.
FIG. 29(b) illustrates a ZVS active clamp flyback converter with integral input filter and series inductor placed in both main switch circuit and rectifier circuit according to the subject invention.
Figure 76:
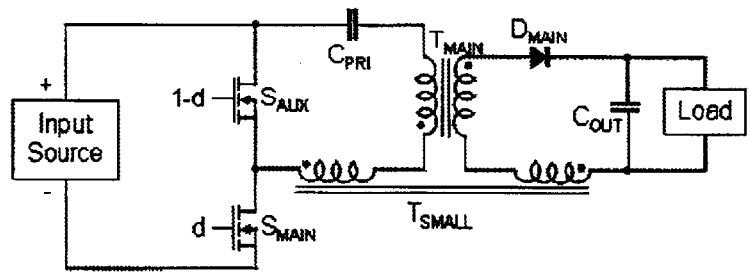

FIG. 76 illustrates a form of the FIG. 29 circuit that has a forward converter transfer function.

Figure 35:
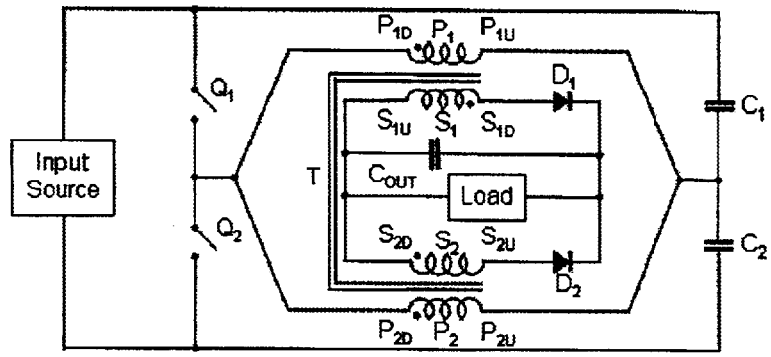
FIG. 35 illustrates a half bridge dc to dc transformer circuit according to the subject invention.
Figure 77:
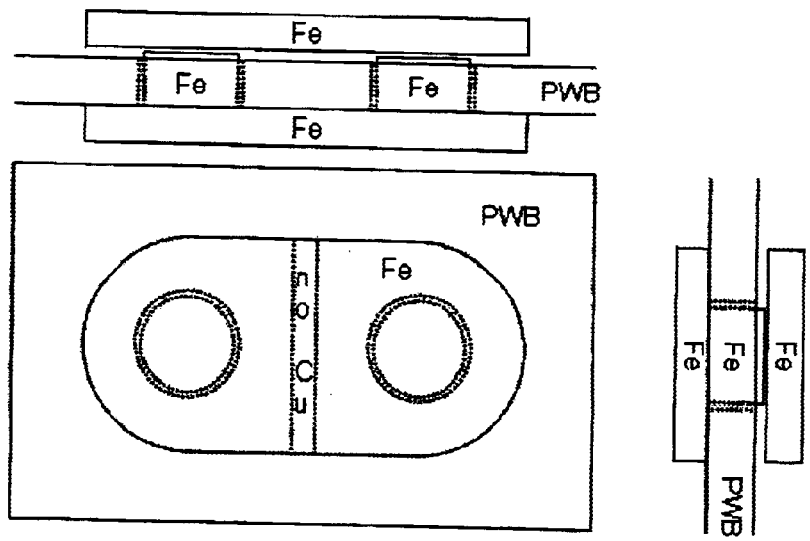

FIG. 77 illustrates a mechanical drawing of a U core suitable for use with the dc to dc transformer circuit of FIG. 35.

Figure 78:
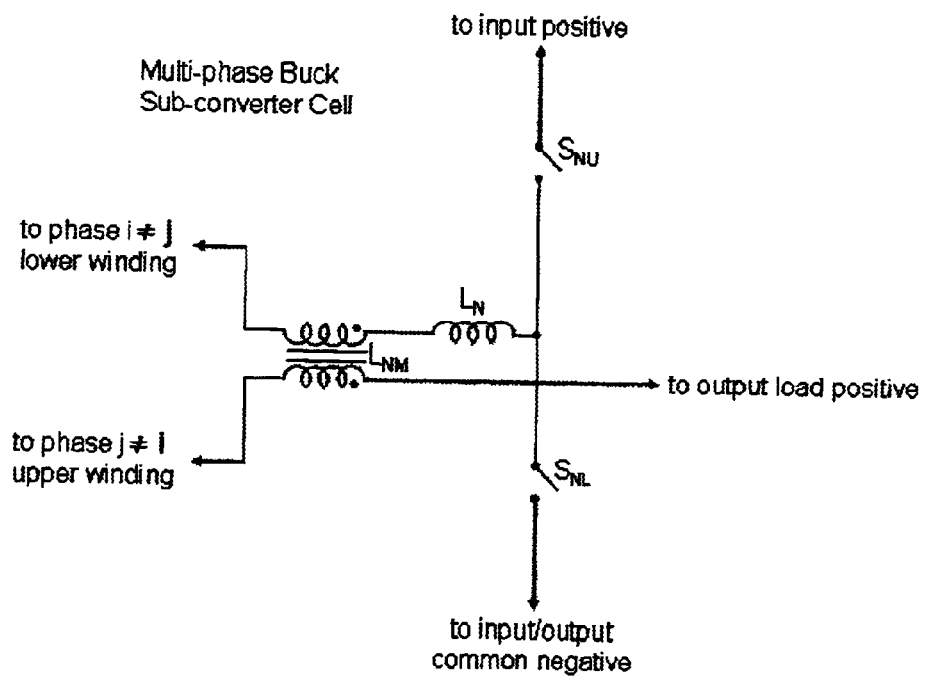

FIG. 78 illustrates a buck type multi-phase converter cell for achieving fast transient response with low current ripple according to the subject invention.

Figure 79:
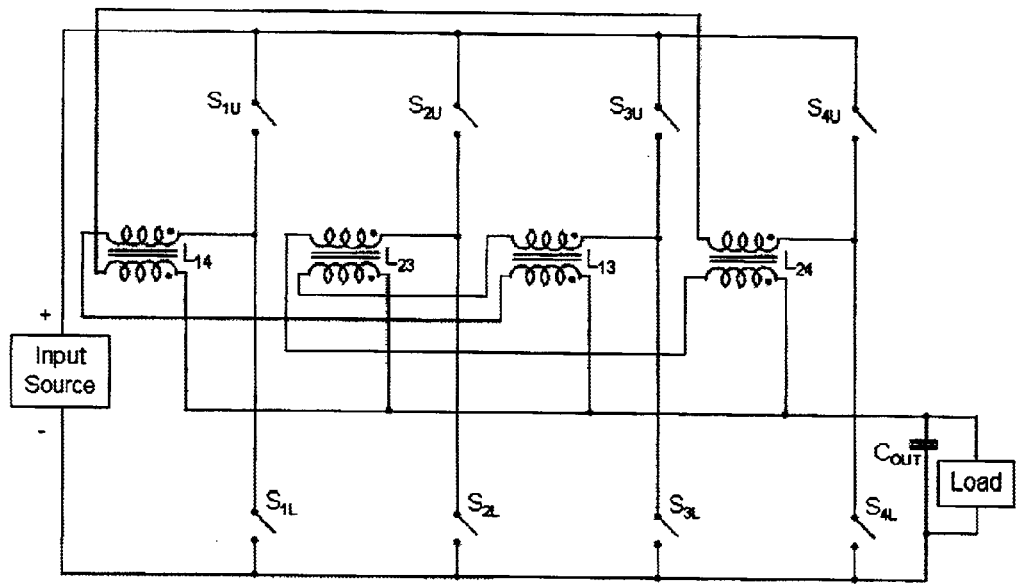

FIG. 79 illustrates a four phase converter circuit using the converter cells of FIG. 78 relying on the leakage inductance for uncoupled inductance.

Figure 80:
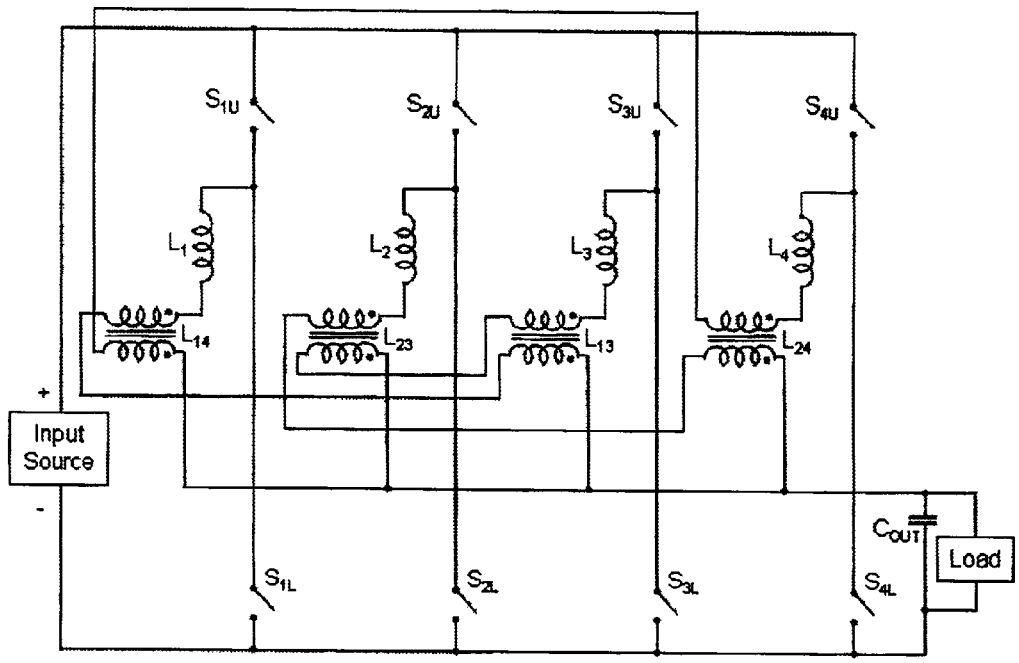

FIG. 80 illustrates a four phase converter circuit using the converter cells of FIG. 78 relying on discrete inductors for uncoupled inductance.

Figure 81:
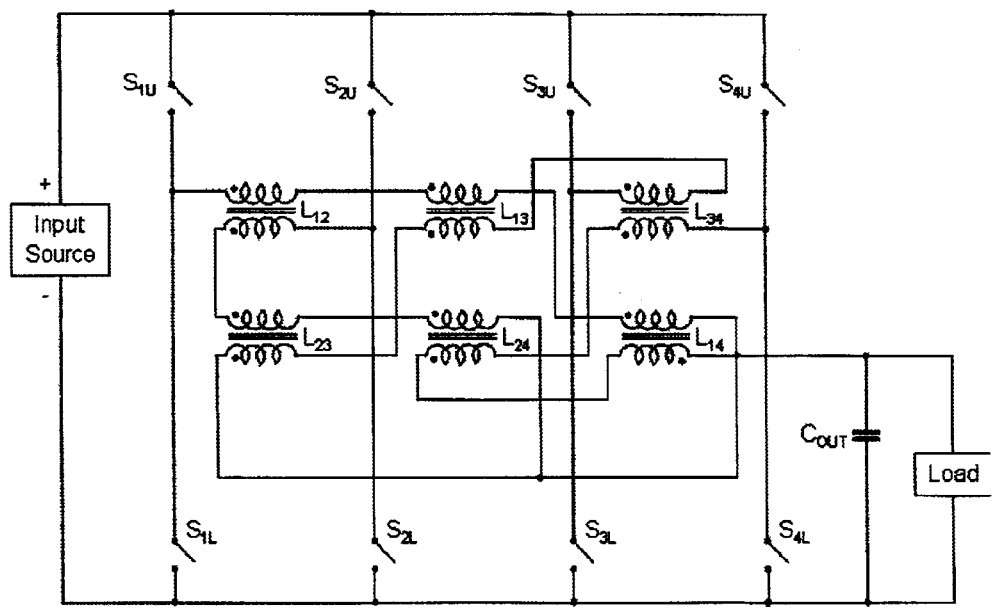

FIG. 81 illustrates the FIG. 79 circuit with two additional coupled inductors added.

Figure 82:
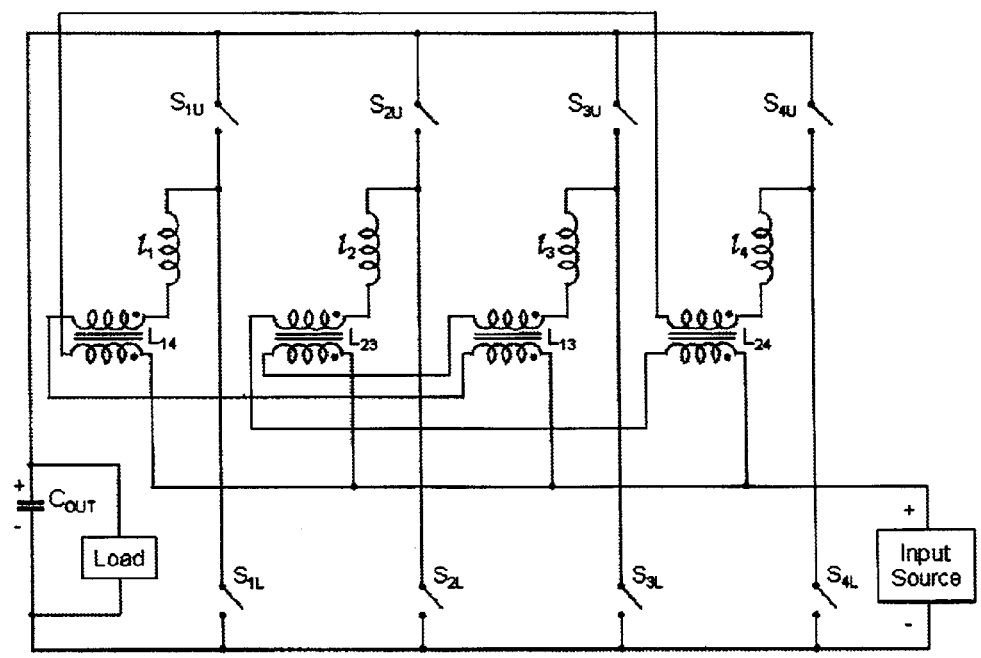

FIG. 82 illustrates a boost form of the FIG. 80 circuit.

Figure 83:
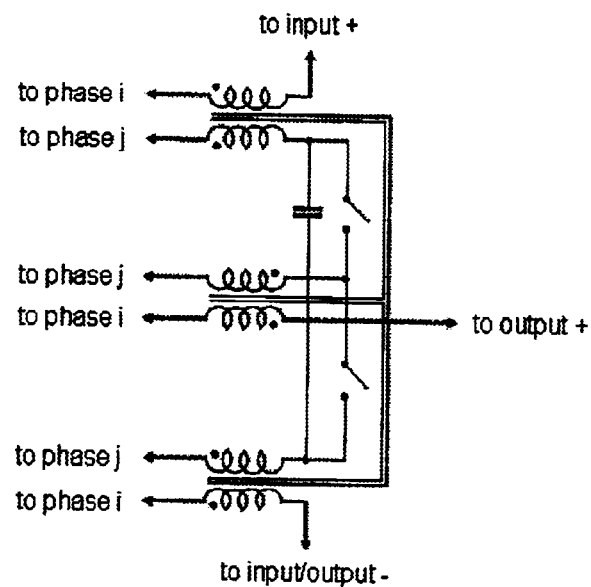

FIG. 83 illustrates a buck type common mode canceling continuous terminal current multi-phase converter cell for achieving fast transient response. low EMI, and low ripple current at both input and output terminals.

Figure 84:
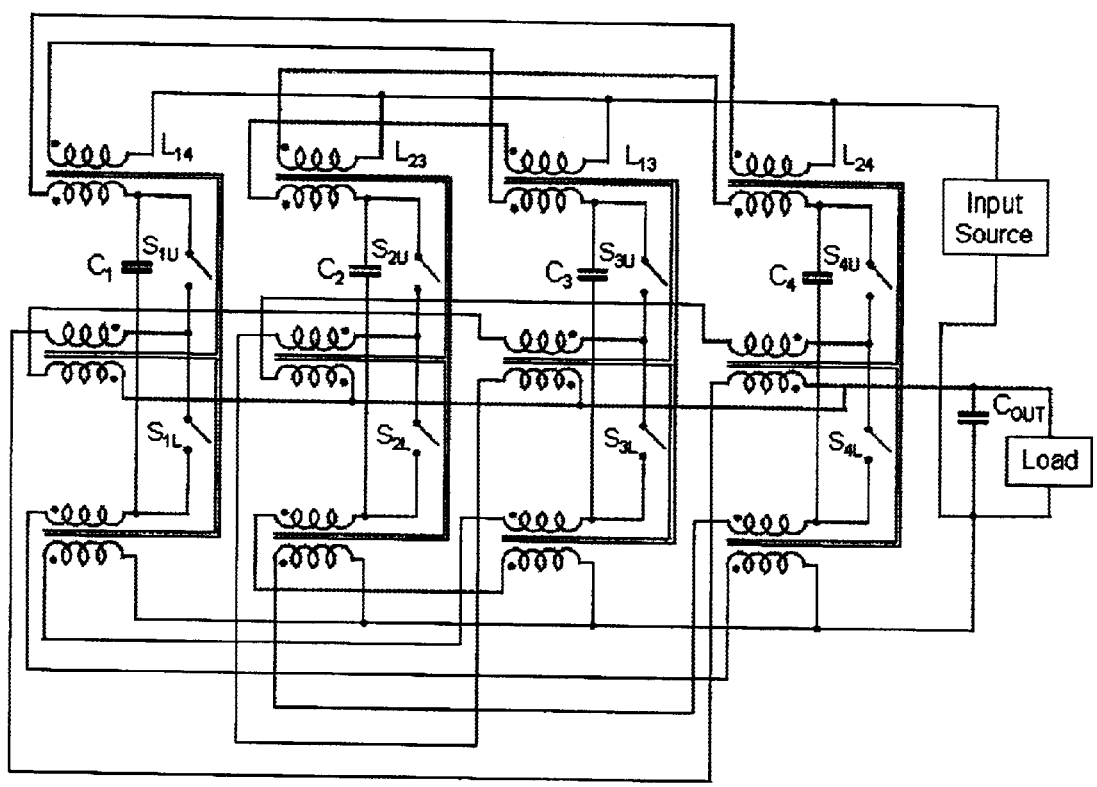

FIG. 84 illustrates a four phase converter circuit using the converter cells of FIG. 83 relying on the leakage inductance of the coupled inductors for uncoupled inductance.

Figure 85:
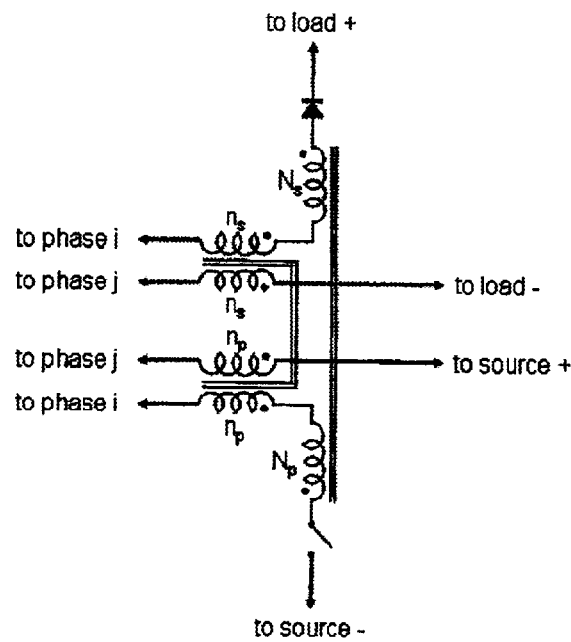

FIG. 85 illustrates a flyback type multi-phase converter cell.

Figure 86:
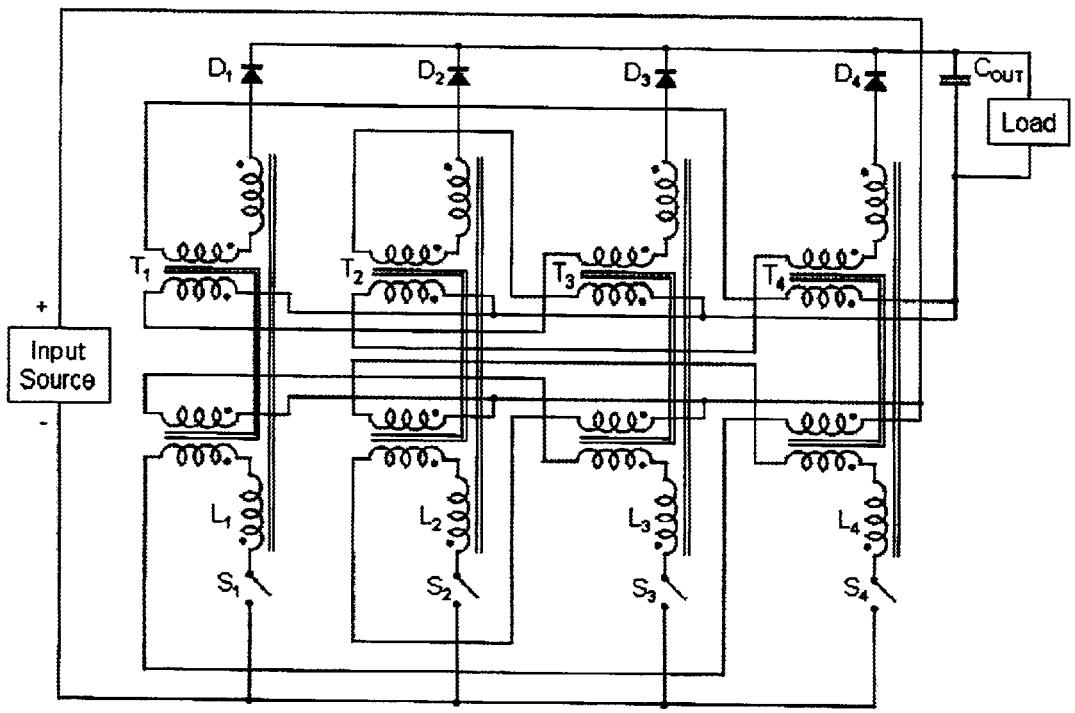

FIG. 86 illustrates a four phase converter circuit using the converter cells of FIG. 85 relying on discrete coupled inductors for uncoupled inductance.

Figure 33:
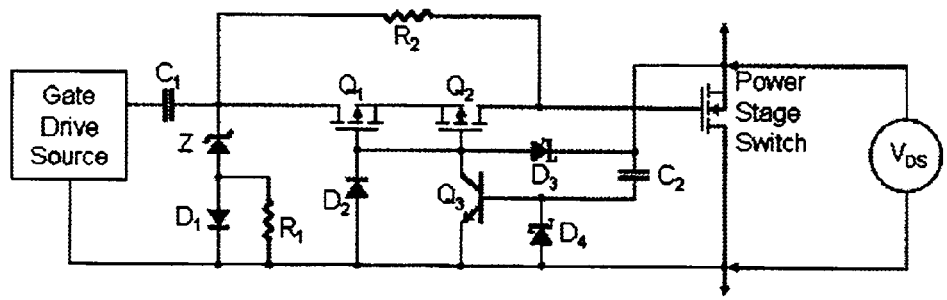
FIG. 33 illustrates a gate drive circuit that provides optimal timing for both energy sufficient and energy insufficient transitions according to the subject invention.
Figure 87:
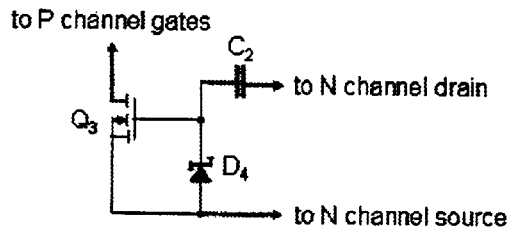

FIG. 87 illustrates an alternative transistor circuit for the adaptive gate driver of FIG. 33.

Figure 88:
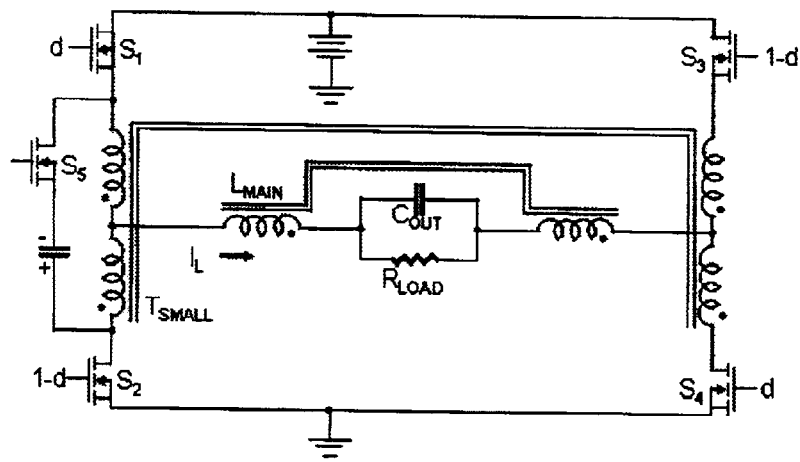

FIG. 88 illustrates a ZVS bi-directional power flow buck converter with a single auxiliary switch and a single coupled inductor for ZVS drive energy.

Figure 89:
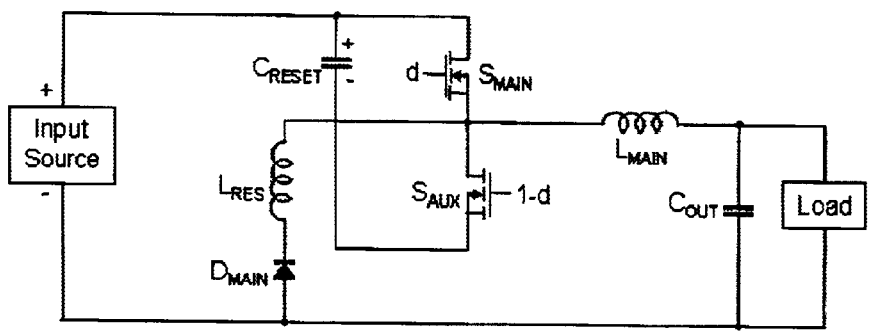

FIG. 89 illustrates a buck converter with a ZVS cell with integral filter.

Figure 90:
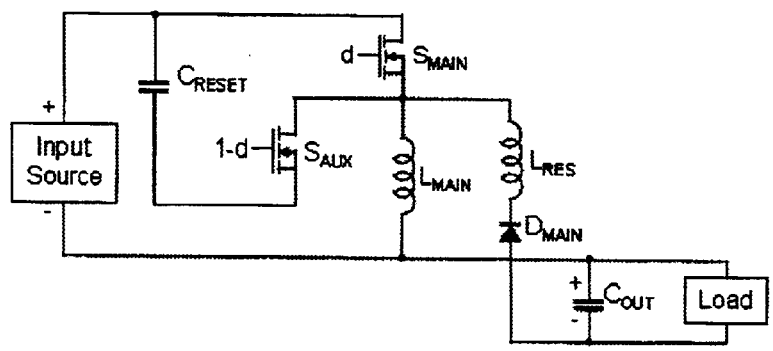

FIG. 90 illustrates a buck boost converter with a ZVS cell with integral filter.

| Reference Numerals | |
|---|---|
| 100 dc input voltage source | 101 inductor |
| 102 inductor | 103 switch |
| 104 switch | 105 diode |
| 106 diode | 107 capacitor |
| 108 capacitor | 109 capacitor |
| 110 capacitor | 111 load |
| 112 node | 113 node |
| 114 node | 115 node |
| 116 node | 117 node |
| 118 node | 119 lead |
| 120 lead | 121 lead |
| 122 diode | |
| 200 dc input voltage source | 201 inductor |
| 202 inductor | 203 switch |
| 204 switch | 205 diode |
| 206 diode | 207 diode |
| 208 capacitor | 209 capacitor |
| 210 capacitor | 211 capacitor |
| 212 load | 213 node |
| 214 node | 215 node |
| 216 node | 217 node |

SUMMARY

The subject invention uses a reset capacitor, an auxiliary switch, and a small coupled inductor to accomplish ZVS in any power converter that uses a single main switch and a single main rectifier. The subject invention also describes circuits and methods for achieving zero voltage switching in bi-directional flow power converters using a single active reset circuit with one auxiliary switch. Adaptive gate drive circuits are revealed that achieve optimal switch timing of the power mosfets for both energy sufficient turn on transitions and energy insufficient turn on transitions. The subject invention reveals a primary switch network that applies one quarter of the input source voltage to the windings of a transformer or coupled magnetic to which the primary switch network is applied. A simple U core magnetic circuit element for use in a novel zero voltage switching dc to dc transformer circuit is revealed with the novel dc to dc transformer circuit. A novel primary switching circuit that yields primary winding network voltage equal to one quarter of the input dc source voltage is revealed. Magnetically coupled power converter cells for multi-phase power converter systems are revealed. Integrated magnetic structures which can be used with the new magnetically coupled power converter cells are also revealed in the subject invention. Methods for creating integrated magnetic core structures from simple commercially available standard core structures are also revealed. A universal zero voltage switching cell using a small core placed in series with a main rectifier switch and an active reset circuit is also revealed.

DESCRIPTION OF THE PREFERRED EMBODIMENTS

Figure 3:
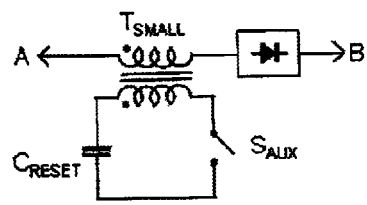
FIG. 3 illustrates a zero voltage switching cell according to the subject invention that eliminates the requirement of a high side drive mechanism.
Figure 4:
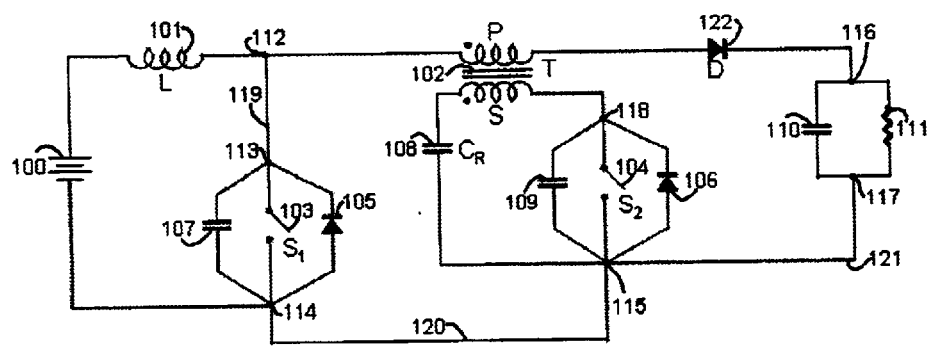
FIG. 4 illustrates the zero voltage switching cell of FIG. 3 applied to a boost converter.

FIG. 3 illustrates the ZVS active reset switch cell of the subject invention. A boost converter using the cell of FIG. 3 is illustrated in FIG. 4. The ZVS cell comprises a main switch, an auxiliary switch, a small auxiliary coupled inductor, and a capacitor. By substituting the ZVS cell for the main rectifier switch in a hard switching power converter circuit the new circuit with the new ZVS cell can achieve elimination of first order switching losses. Moreover, the new switching cell does not require a high side drive mechanism.

Structure

A positive terminal of an input source 100 is connected to a first terminal of an inductor 101. A second terminal of inductor 101 is connected to a node 112. Node 112 is connected to a lead 119 and to a dotted terminal of a primary winding of a coupled inductor 102. Lead 119 is connected to a node 113. Node 113 is connected to a first terminal of a capacitor 107, to a first terminal of a switch 103, and to a cathode terminal of a diode 105. A negative terminal of source 100 is connected to a node 114. Node 114 is connected to a second terminal of capacitor 107, to a second terminal of switch 103, to an anode terminal of diode 105, and to a lead 120. An undotted terminal of the primary winding of coupled inductor 102 is connected to an anode terminal of a diode 122. A cathode terminal of diode 122 is connected to a node 116. Node 116 is connected to a first terminal of a capacitor 110 and to a first terminal of a load 111. A second terminal of capacitor 110 is connected to a node 117. Node 117 is connected to a second terminal of load 111 and to a lead 121. Lead 121 is connected to a node 115. Node 115 is connected to lead 120, to a first terminal of a capacitor 108, to a first terminal of a capacitor 109, to a first terminal of a switch 104, and to an anode terminal of a diode 106. A second terminal of capacitor 108 is connected to a dotted terminal of a secondary winding of coupled inductor 102. An undotted terminal of coupled inductor 102 is connected to a node 118. Node 118 is connected to a second terminal of capacitor 109, to a second terminal of switch 104, and to a cathode terminal of diode 106.

Operation

Figure 5:
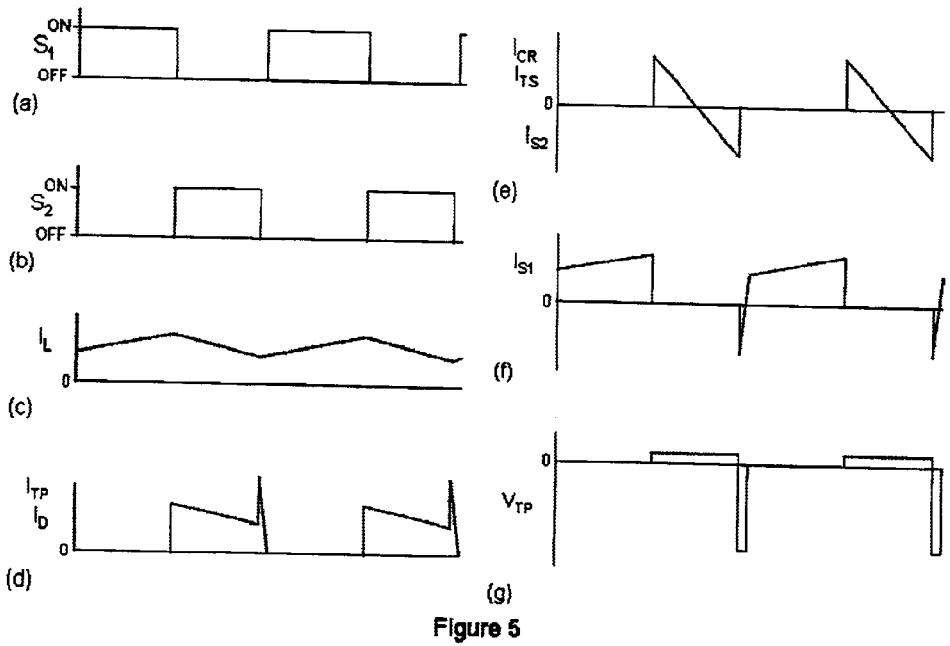
FIG. 5 illustrates wave forms of the FIG. 4 circuit.
Figure 6:
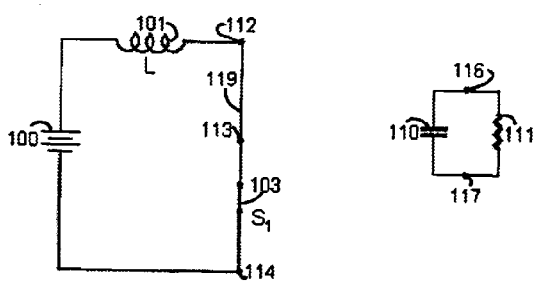
FIG. 6 illustrates an on state of the FIG. 4 circuit.
Figure 7:
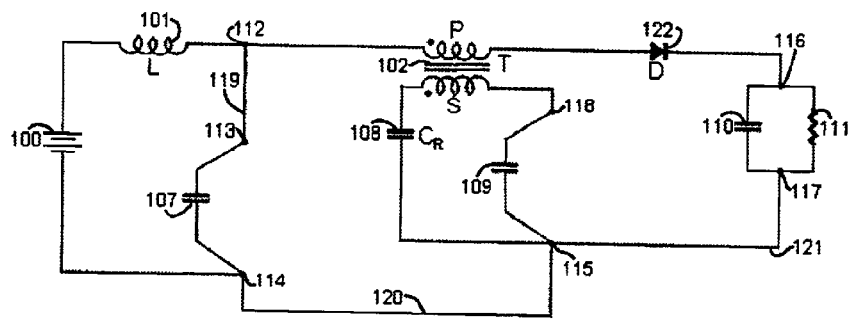
FIG. 7 illustrates a first phase of a turn off transition of the FIG. 4 circuit.
Figure 8:
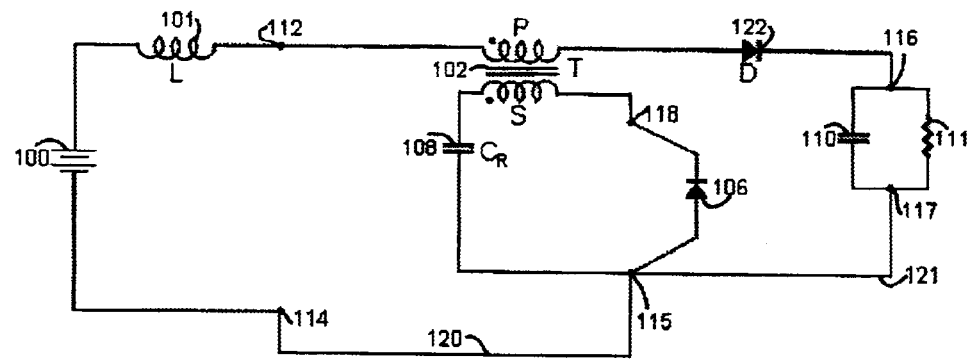
FIG. 8 illustrates a second phase of a turn off transition of the FIG. 4 circuit.
Figure 9:
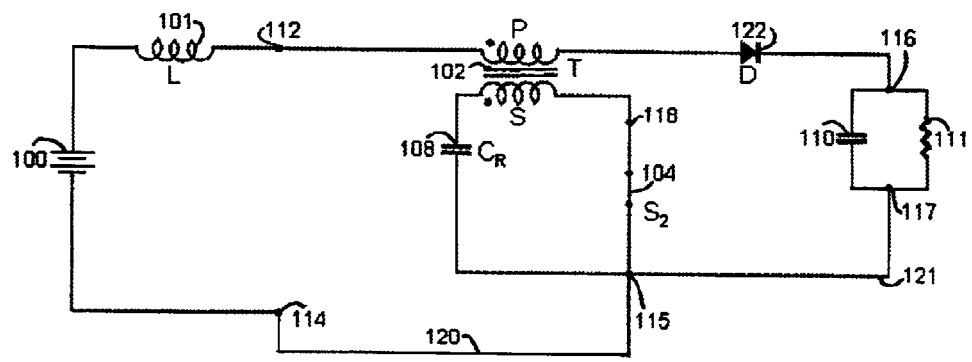
FIG. 9 illustrates an off state of the FIG. 4 circuit.
Figure 10:
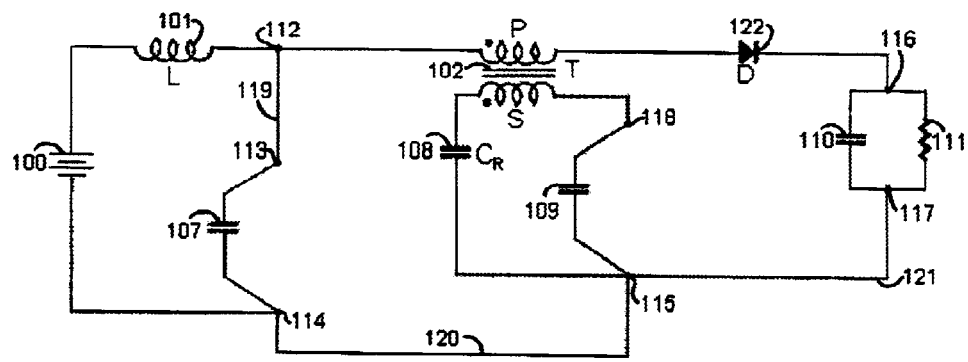
FIG. 10 illustrates a first phase of a turn on transition of the FIG. 4 circuit.
Figure 11:
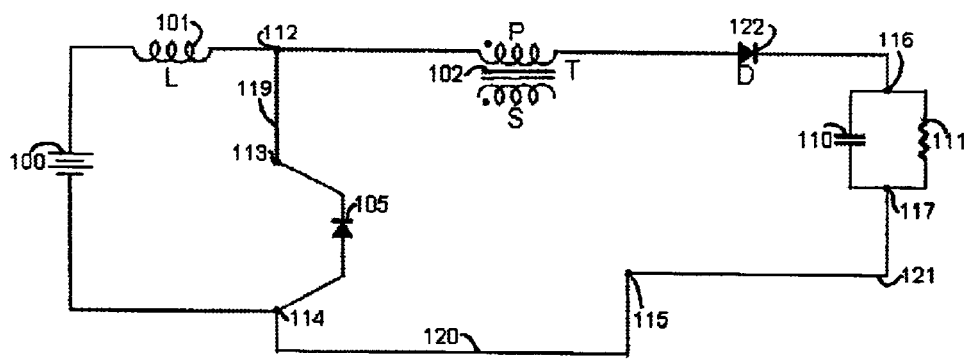
FIG. 11 illustrates a second phase of a turn on transition of the FIG. 4 circuit.

Referring to FIG. 6, during an initial condition and on state of the circuit, switch 103 is on, switch 104 is off, and diode 122 is reverse biased. During the on state current and magnetic energy ramps up in inductor 101 and capacitor 110 provides energy and current to the load 111. Wave forms for the circuit are illustrated in FIGS. 5(*a*) through 5(*g*). At a time determined by a control circuit switch 103 is turned off (opened) which begins the first phase of a turn off transition, as illustrated in FIG. 7. When switch 103 is turned off the switch current transfers into the parallel capacitor 107 and the voltage at node 112 rises. As the voltage at node 112 rises the voltage at the dotted terminals of coupled inductor 102 rises with respect to the undotted terminals of coupled inductor 102. During this first phase of the off transition, capacitor 107 is being charged up and capacitor 109 is being discharged and diode 122 begins to conduct. We assume that capacitor 108 is much larger than capacitor 109 so that the voltage of capacitor 108 is invariant during the switching transitions. Capacitor 109 continues to discharge and capacitor 107 continues to charge until diode 106 becomes forward biased, as illustrated in FIG. 8, at which time the second phase of the turn off transition begins. When the diode 106 turns on, the capacitor 107 stops charging up and the inductor 101 current transfers from the capacitor 107 to the primary winding of the inductor 102. Forcing the inductor 101 current into the dotted terminal of the primary winding of the inductor 102 has the effect of forcing a corresponding current out of the dotted terminal of the secondary winding of the inductor 102. Soon after diode 106 begins to conduct, switch 104 is turned on at zero voltage, as illustrated in FIG. 9. FIG. 9 illustrates an off state of the converter. During the off state, stored energy and current ramps down in inductor 101. At the beginning of the off state, the current in the secondary winding of the inductor 102 is equal to the peak inductor 101 current multiplied by the turns ratio of coupled inductor 102. Current flows into capacitor 108 from the dotted terminal of the secondary winding of inductor 102 and ramps down to zero then continues to ramp down until the capacitor 108 current reaches a value equal in magnitude to the capacitor 108 current at the beginning of the off state, but opposite in direction, at which time the switch 104 is turned off, as illustrated in FIG. 10. When switch 104 is turned off the switch current shifts into the capacitor 109 forcing the undotted terminals of inductor 102 to rise in voltage with respect to the dotted terminals of inductor 102. As a result, the voltage at node 112 falls and capacitor 107 is discharged until the diode 105 begins to conduct, as illustrated in FIG. 11. Soon after diode 105 begins to conduct switch 103 is turned on at zero voltage, as illustrated in FIG. 6, at which time a new on state and a new cycle begins. At the beginning of the on state the excess energy stored in the coupled inductor 102 will keep the diode 122 conducting until the current in the primary winding of the inductor 102 equals the current in the inductor 101. During the full cycle of operation all of the switches were turned on at zero voltage. The FIG. 4 circuit relies on an auxiliary switch which can be referenced to ground or any other convenient circuit node, thereby eliminating the need for a high side switch and a high side drive mechanism. Also the current stresses in the main switch 103 and main rectifier 122 are approximately equal to the current stresses in the hard switching converter from which the FIG. 4 circuit was derived. The voltage stress of the main switch 103 is increased, but only slightly, from the voltage stress experienced by the main switch in the hard switching derivative circuit.

Related Embodiments

Figure 1:
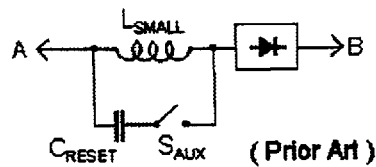
FIG. 1 illustrates a zero voltage switching cell according to the prior art.
Figure 2:
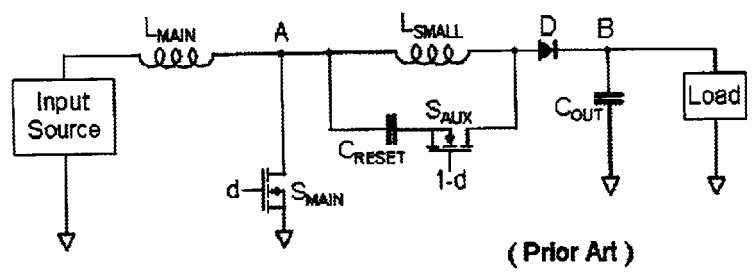
FIG. 2 illustrates the zero voltage switching cell of FIG. 1 applied to a boost converter.
Figure 12:
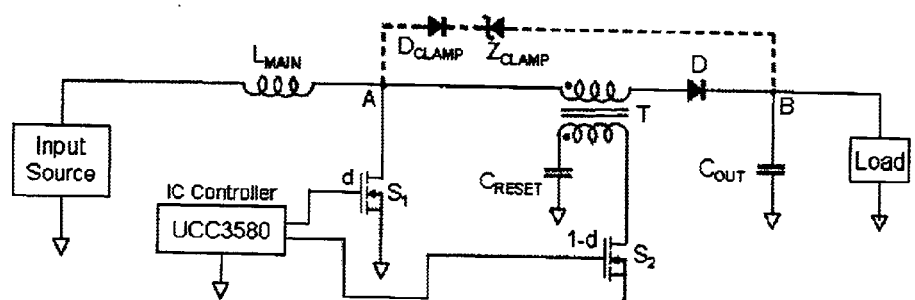
FIG. 12 illustrates the FIG. 4 circuit implemented with mosfets and an IC controller with an optional clamp circuit for clamping a leakage inductance spike.

FIG. 12 illustrates a circuit similar to the FIG. 4 circuit but with the main and auxiliary switches implemented using mosfets. An optional clamp network is shown which clamps any voltage spike resulting from leakage inductance of the small coupled inductor. A popular commercially available active reset controller IC is used in the FIG. 12 circuit driving both the main switch and the auxiliary switch directly without the need for a gate drive transformer or high side driver circuit, as would be required for the prior art circuit, illustrated in FIG. 2.

Figure 13:
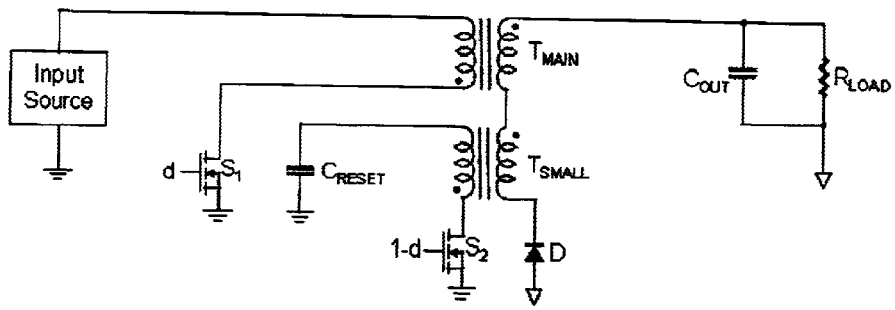
FIG. 13 illustrates the application of the FIG. 3 ZVS cell to a flyback converter.

FIG. 13 illustrates the switching cell of the subject invention applied to an isolated flyback converter.

Structure

Figure 14:
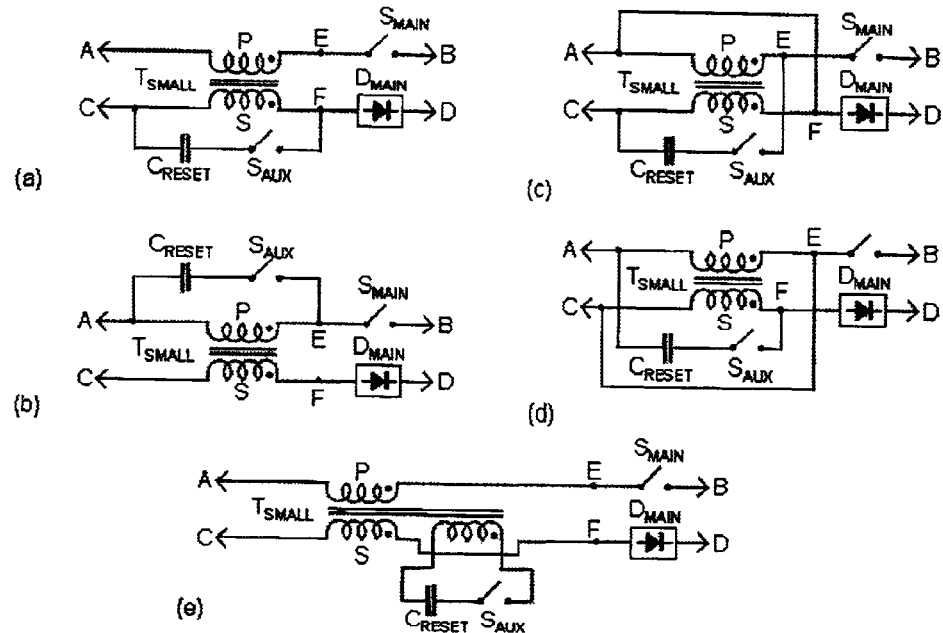
FIG. 14(a) illustrates a ZVS cell according to the subject invention with windings placed in both the main switch leg and the rectifier leg with the active clamp network placed parallel to the rectifier leg winding.
FIG. 14(b) illustrates a ZVS cell according to the subject invention with windings placed in both the main switch leg and the rectifier leg with the active clamp network placed parallel to the main switch leg winding.
FIG. 14(c) illustrates a ZVS cell according to the subject invention with windings placed in both the main switch leg and the rectifier leg with the active clamp network placed parallel to both the main switch leg winding and the rectifier leg winding.
FIG. 14(d) illustrates a ZVS cell according to the subject invention with windings placed in both the main switch leg and the rectifier leg with an alternative arrangement of the active clamp network placed parallel to both the main switch leg winding and the rectifier leg winding.
FIG. 14(e) illustrates a ZVS cell according to the subject invention with windings placed in both the main switch leg and the rectifier leg with a third winding added to accommodate the active clamp network which can be ground referenced.

FIG. 14(*a*) illustrates a zero voltage switching cell employing a coupled inductor in which one winding is placed in series with the main switch and the other winding is placed in series with the main rectifier. This zero voltage switch cell is universally applicable to any hard switching power converter which effectively employs a single main switch and a single main rectifier which operates in anti-synchronization to the single main switch. Any power converter that uses two main switches connected such that they have equal currents and operate in synchronization should be considered as single main switch converters since the switch series connections results in a single effective switch with the same current stress capability but twice the voltage stress capability as one of the two main switches used in the circuit. Also any power converter circuit that uses two parallel main switches that operate in synchronization but share the total switch current should be considered as a single main switch power converter. In the FIG. 14(*a*) circuit the active reset network comprising an auxiliary switch, which operates in anti-synchronization to the single main switch, and a reset capacitor, is connected in parallel with the main rectifier winding of the coupled inductor. Other connections of the active reset network are possible, all of which yield similar results and operate in a similar manner. FIG. 14(*b*) illustrates the connection of the active reset network in parallel with the main switch. FIG. 14(*c*) illustrates the active reset network connected between the undotted terminal of the rectifier switch winding and the dotted terminal of the main switch winding. FIG. 14(*d*) illustrates the active reset network connected to the undotted terminal of the main switch winding and the dotted terminal of the rectifier switch winding. FIG. 14(*e*) illustrates the active reset network connected to a third winding which enables the auxiliary switch connection to any desired circuit node.

Figure 15:
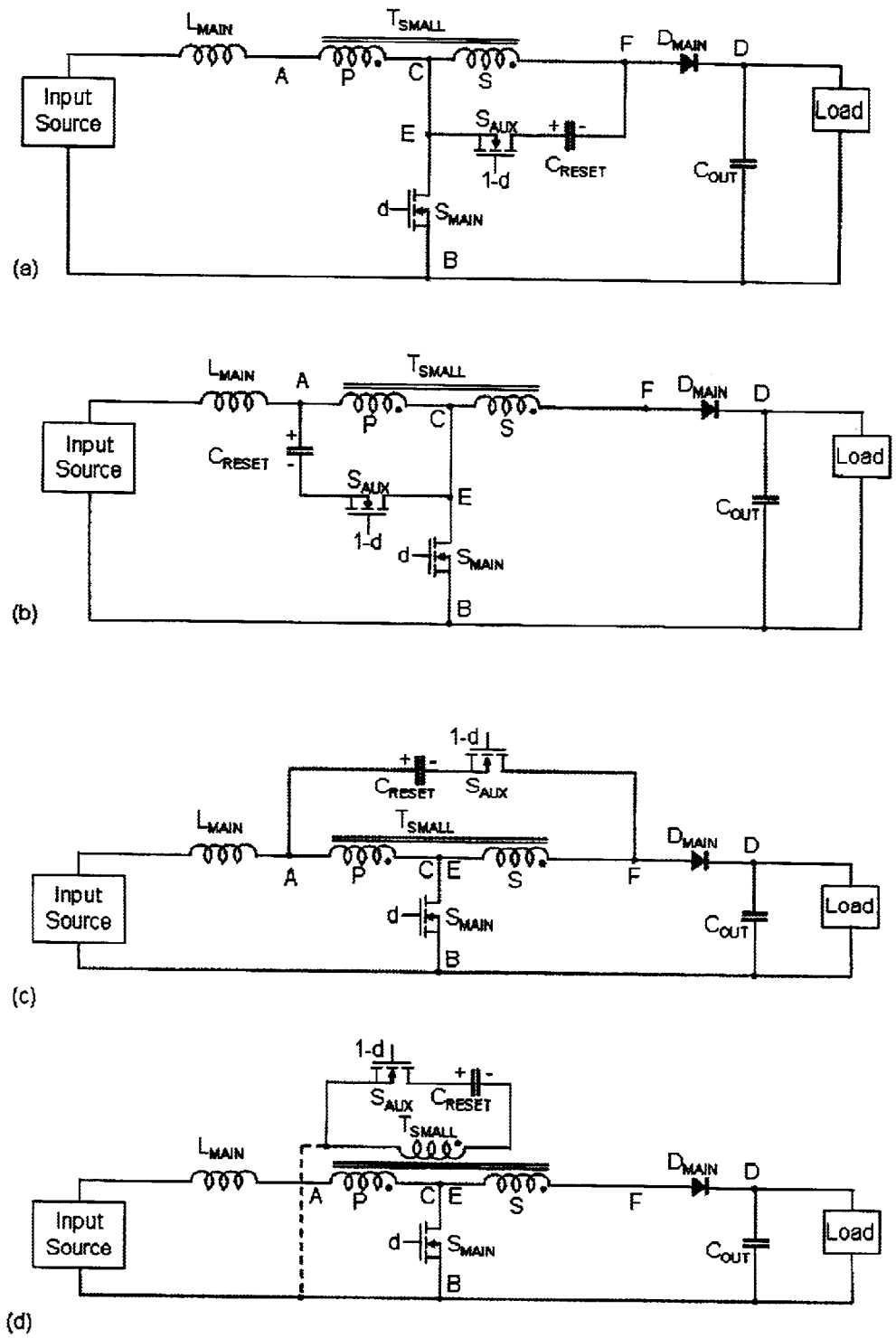
FIG. 15(a) illustrates the ZVS cell of FIG. 14(a) applied to a boost converter.
FIG. 15(b) illustrates the ZVS cell of FIG. 14(b) applied to a boost converter.
FIG. 15(c) illustrates the ZVS cell of FIG. 14(d) applied to a boost converter.
FIG. 15(d) illustrates the ZVS cell of FIG. 14(e) applied to a boost converter.
Figure 17:
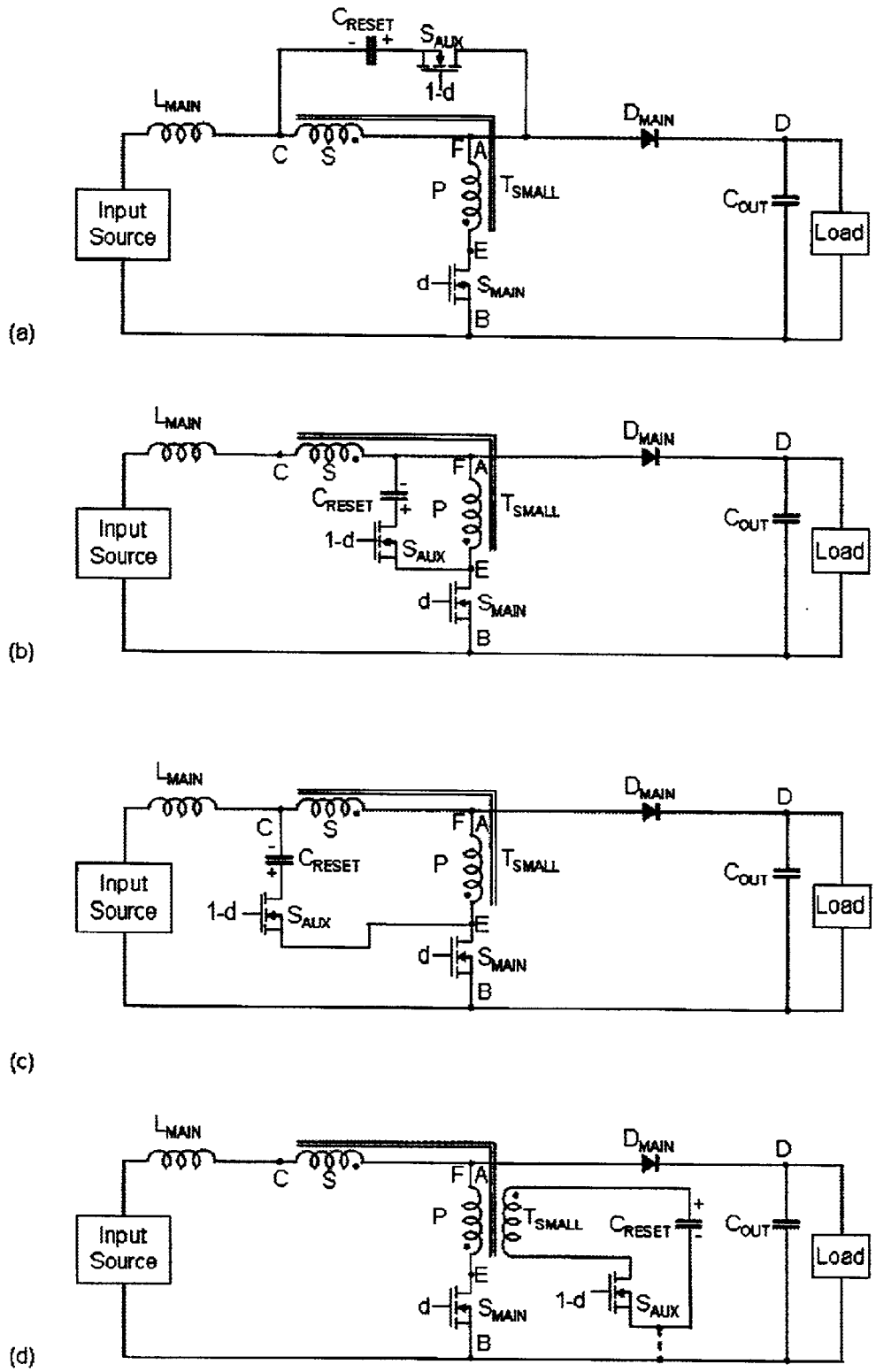
FIG. 17(a) illustrates an alternate arrangement of the ZVS cell of FIG. 14(a) applied to a boost converter.
FIG. 17(b) illustrates an alternate arrangement of the ZVS cell of FIG. 14(b) applied to a boost converter.
FIG. 17(c) illustrates the ZVS cell of FIG. 14(c) applied to a boost converter.
FIG. 17(d) illustrates an alternate arrangement of the ZVS cell of FIG. 14(e) applied to a boost converter.

FIG. 15(*a*) illustrates a boost converter which employs the FIG. 14(*a*) switching cell. FIG. 15(*b*) illustrates a boost converter with the FIG. 14(*b*) switching cell. FIG. 15(*c*) illustrates a boost converter with the switching cell of FIG. 14(*d*). FIG. 15(*d*) illustrates a boost converter employing the switching cell of FIG. 14(*e*). There are alternate arrangements of the switching cell connections for a boost converter. The alternate arrangements are illustrated in FIGS. 17(*a*) through 17(*d*). FIG. 17(*a*) illustrates a boost converter using the switching cell of FIG. 14(*a*). FIG. 17(*b*) illustrates a boost converter using the switching cell of FIG. 14(*b*). FIG. 17(*c*) illustrates a boost converter using the switching cell of FIG. 14(*c*). FIG. 17(*d*) illustrates a boost converter using the switching cell of FIG. 14(*e*). The differences between the FIG. 15 and FIG. 17 circuits are related to how the main switch networks are connected to the rectifier switch networks. The switch networks need not be connected to each other in many cases.

Operation

Figure 16:
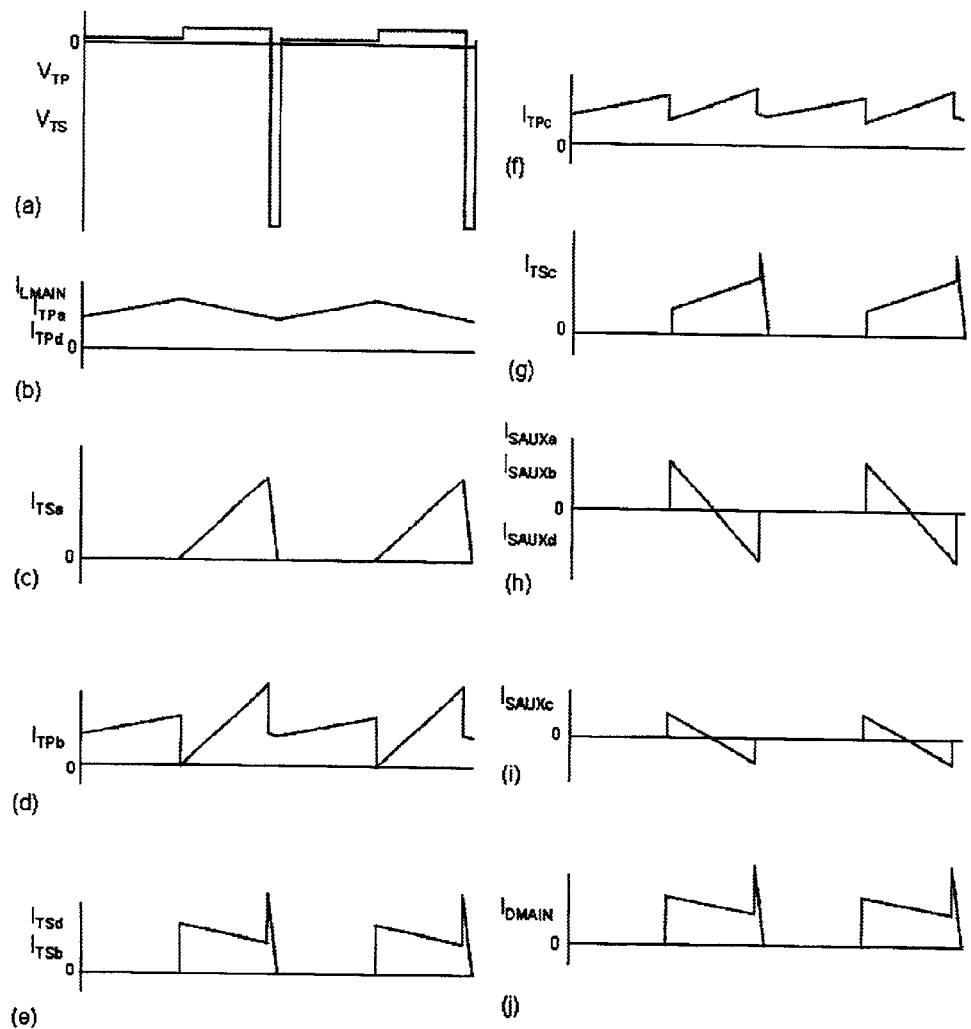
FIG. 16 illustrates wave forms of the FIG. 15 circuits.
Figure 18:
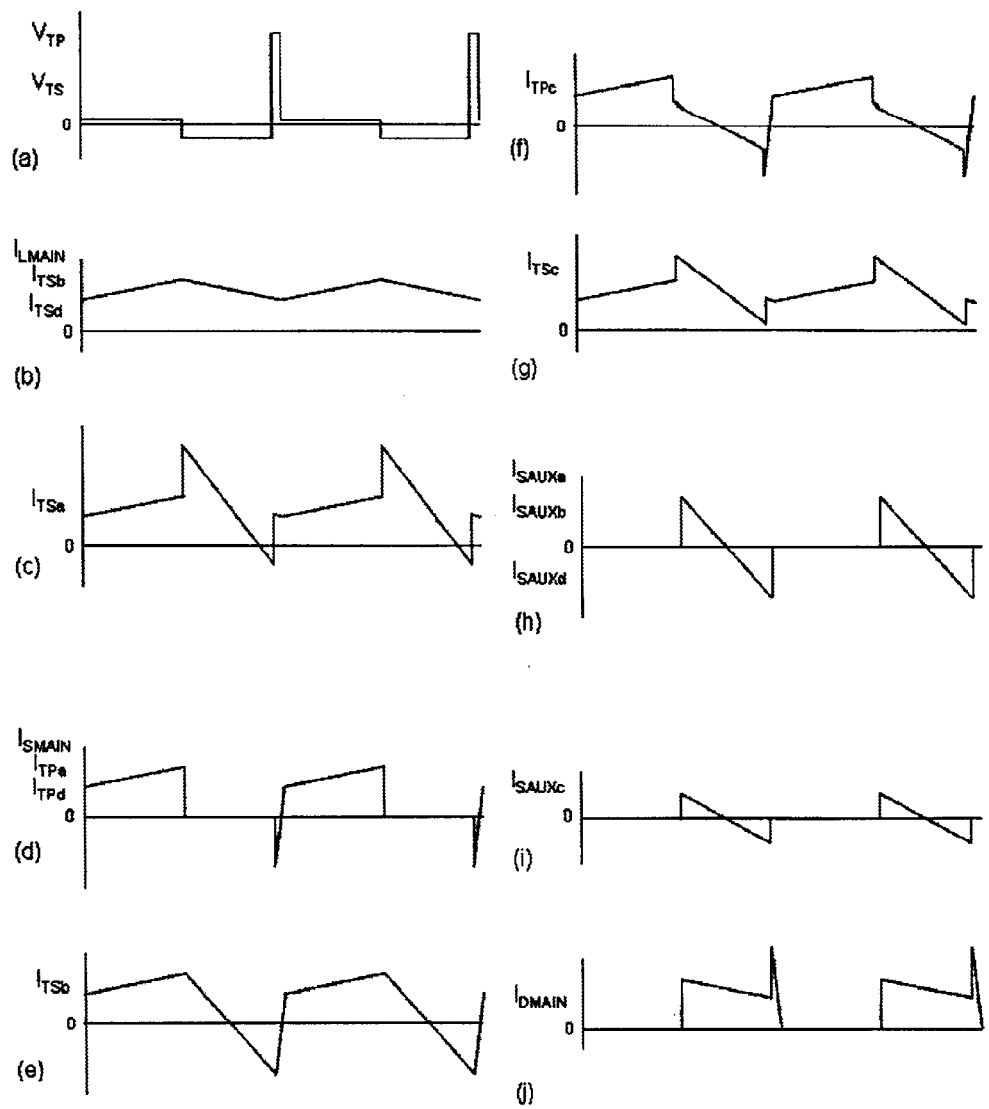
FIG. 18 illustrates wave forms of the FIG. 17 circuits.
Figure 26:
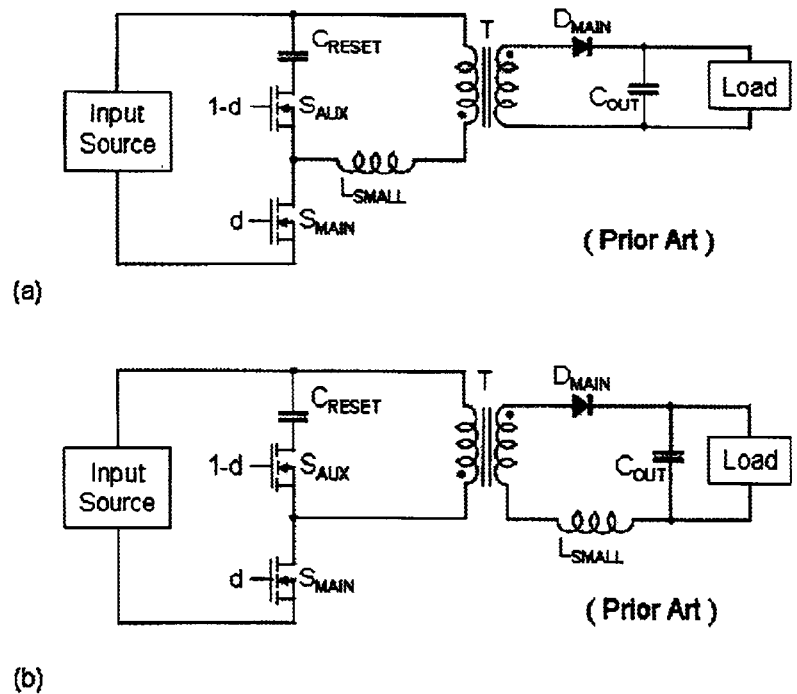
FIG. 26(a) illustrates a prior art ZVS active clamp flyback converter circuit with primary placed series inductor.
FIG. 26(b) illustrates a prior art ZVS active clamp flyback converter circuit with secondary placed series inductor.
Figure 27:
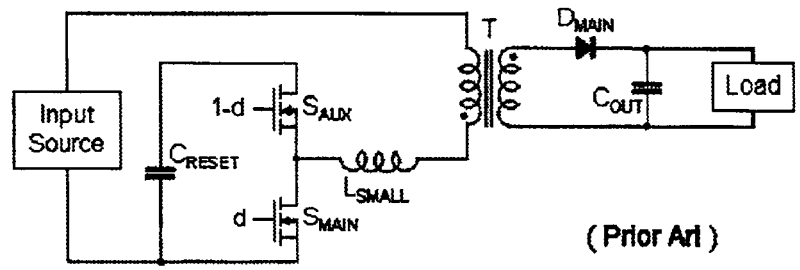
FIG. 27 illustrates a prior art ZVS active clamp flyback converter with integral input filter.

The operation of the new switching cells is illustrated for the FIG. 15 circuits in FIGS. 16(*a*) through 16(*j*). The operation of the new switching cell for the FIG. 17 circuits is illustrated in FIGS. 18(*a*) through 18(*j*). In each case the operation is similar to the other cases with some minor differences. In every case the current in the active reset capacitor reverses during the off state of the main switch thereby providing stored energy in the coupled inductor that will force the body diode of the main switch to conduct immediately after the auxiliary switch is turned off. In the cases where the active reset network is placed across a single winding the magnitude of the initial and final currents in the active reset network is equal to the peak current in the main inductor and main switch. In the cases where the active reset network is connected in parallel with two windings as in FIGS. 15(c) and 17(c) the active reset current is half of the peak current of the main inductor and main switch, but the voltage stress of the auxiliary switch is double the stress for the other cases so there is no switch stress advantage to the FIGS. 15(c) and 17(c) circuits. Voltage stress versus current stress trade offs can be done with the FIG. 15(d) and FIG. 17(d) circuits by adjusting the turns of the tertiary winding.

During an on state of the main switch current ramps up in the main switch, in the primary winding of the coupled inductor, and in the main inductor. During the on state the auxiliary switch and the main rectifier diode do not conduct. In the FIG. 17 circuits the same current ramps up in the secondary winding of the coupled inductor during the on state. At the end of the on state the main switch is turned off. The stored energy in the main inductor forces the voltage across the main switch to rise and the voltage across the auxiliary switch and main rectifier to fall until the main rectifier and the body diode of the auxiliary switch begin to conduct. Soon after the body diode of the auxiliary switch begins to conduct the auxiliary switch is turned on at zero voltage. When the auxiliary switch begins to conduct the peak current in the main inductor is forced into the main rectifier by the energy stored in the main inductor. In the FIG. 15 circuits forcing current into the main rectifier forces current into the undotted terminal of the secondary winding of the coupled inductor which forces current out of the undotted terminal of the primary winding and into the active reset network. In the FIG. 15(a) circuit current is not forced into the secondary winding of the coupled inductor but rather into the active reset network. In each case current is forced into the active reset network at the beginning of the off state and the current in the active reset network reverses during the off state of the main switch while the auxiliary switch conducts. In some cases an abrupt change in winding current due to the turn off of a switch results in a corresponding change in the current in the other windings so as to maintain the total magnetic energy in the coupled inductor and the same NI product, where N is the number of turns and I is the current in those turns. When the auxiliary switch turns off at the end of the off state the energy stored in the coupled inductor and the current in the coupled inductor is directed to force an increase in voltage to the auxiliary switch and a decrease in voltage to the main switch that continues until the body diode of the main switch becomes forward biased and the main switch is turned on at zero voltage.

Related Embodiments

FIG. 75 illustrates the switching cell of FIG. 14(d) applied to a Cuk converter.

FIG. 19 illustrates the switching cells of FIG. 14(c) applied to a bi-directional power flow buck converter that might be used as a servo or audio amplifier. In the FIG. 19 circuit the power flow may be from left to right or from right to left, so that the role of main switch and synchronous rectifier is dependent on the direction of power flow. For power flow from left to right $S_1$ and $S_4$ serve as main switches and $S_2$ and $S_3$ serve as synchronous rectifiers. For power flow from right to left $S_2$ and $S_3$ serve as main switches and $S_1$ and $S_4$ serve as synchronous rectifiers. In order to accomplish zero voltage switching with an active reset switching cell the auxiliary switch must be operated in anti-synchronization to the main switch. Zero voltage switching can be accomplished using the active reset circuit of FIG. 19 if the auxiliary switches $S_5$ and $S_6$ can be operated in anti-synchronization to the main switches. A circuit similar to the FIG. 19 embodiment but with a single auxiliary switch and a single small magnetic circuit element is illustrated in FIG. 88. In the FIG. 88 embodiment the single small magnetic has four equal balanced windings that drives zero voltage turn on transitions for the main switches in both converter legs. Another power converter circuit with bi-directional power flow is illustrated in FIG. 22. The FIG. 22 circuit is a boost complement converter, also known as a four quadrant converter. When the duty cycle of the $S_1$ switch is greater than 50% the power flow is from left to right and the output voltage is positive. At 50% duty cycle the output voltage is zero. For duty cycles less than 50% the output voltage is negative and power flows from right to left. In both the FIG. 19 circuit and the FIG. 22 circuit by changing the duty cycle of the switches the output voltage and direction of current and power flow can change. By inverting the drive signal to the auxiliary switch(es) when the direction of current changes the active reset circuit(s) can provide a mechanism for zero voltage switching in both directions using a single active reset circuit (or two active reset circuits for the full bridge circuit of FIG. 19). Circuit wave forms illustrating the operation of the FIG. 19 circuit with a mechanism for inverting the auxiliary switch drive signal when the current changes direction are illustrated in FIGS. 20 and 21. Gate drive logic for the FIG. 22 circuit is illustrated in FIG. 23. The gate drive signal for the auxiliary switch is either inverted or not inverted depending on the direction of the current in the main coupled inductor. An analog of the output current is fed to a comparator to detect the current direction by comparing the current analog to zero volts. The direction signal from the output of the comparator is then fed to one input of an XOR gate. The other input to the XOR gate is the $S_1$ gate drive signal. If the direction of current flow is positive a logic high will be fed to the XOR gate and the $S_1$ gate drive signal will be inverted and fed to the gate of the auxiliary switch as desired. For power flow from right to left the comparator output will have a logic low, which when fed to the XOR gate provides a non-inverted output so that the auxiliary switch will be synchronized with the $S_1$ switch, as desired, since for negative output the $S_1$ switch is a synchronous rectifier. The wave forms for positive and negative power flow for the FIG. 22 circuit are illustrated in FIGS. 24 and 25, respectively.

Structure

Figure 28:
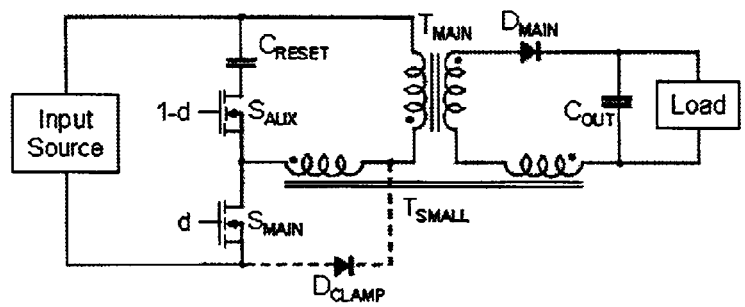
FIG. 28 illustrates a ZVS active clamp flyback converter with coupled series inductance placed in series with both main switch and rectifier switch according to the subject invention.

FIG. 28 illustrates a ZVS active clamp flyback converter with a coupled inductor in series with the main flyback transformer. A positive terminal of an input source is connected to an undotted terminal of the primary winding of the main flyback transformer and to a first terminal of a reset capacitor. A second terminal of the reset capacitor is connected to the drain of an auxiliary switch. The source of the auxiliary switch is connected to the drain of a main switch and to a dotted terminal of a primary winding of a coupled inductor. The source of the main switch is connected to the negative terminal of the source. An undotted terminal of the primary winding of the coupled inductor is connected to a dotted terminal of the primary winding of the main flyback transformer. In the secondary circuit a dotted terminal of a secondary winding of the main flyback transformer is connected to an anode terminal of a diode. A cathode terminal of the diode is connected to a first terminal of an output capacitor and to a first terminal of a load. A second terminal of the output capacitor is connected to a second terminal of the load and to a dotted terminal of a secondary winding of the coupled inductor. An undotted terminal of the secondary winding of the coupled inductor is connected to an undotted terminal of the secondary winding of the main flyback transformer.

Operation

During an on state of the FIG. 28 circuit the main switch is on and the auxiliary switch and output diode are off. During the on state current and energy ramp up in the flyback transformer primary winding. At a time dependent on the control circuit the main switch is turned off. Stored energy in the flyback transformer forces the voltage across the main switch to rise and the voltages across the auxiliary switch and diode to fall until the body diode of the auxiliary switch and the output diode begin to conduct. At the start of the off state the current in the primary windings and the auxiliary switch is equal to the peak primary winding current and the current in the secondary windings is zero. During the off state current ramps down in the primary windings and current ramps up in the secondary windings. At the end of the off state the current in the primary windings is equal in magnitude, but opposite in direction, to the current in the primary windings at the beginning of the off state. When the auxiliary switch is turned off the stored energy in the coupled inductor forces the voltage across the main switch to fall until the body diode of the main switch begins to conduct at which time the main switch can be turned on at zero voltage. While the voltage across the main switch falls the current in the secondary windings begins to drop. After the main switch is turned on the current in the secondary windings continues to ramp down to zero current at which time the diode turns off and a new cycle and a new on state begin. The optional diode clamps ringing associated with the small coupled inductor and the parasitic capacitance of the main rectifier.

Related Embodiments

A variation of the FIG. 28 circuit, but with a forward converter transfer function, is illustrated in FIG. 76.

FIG. 29(a) reveals another ZVS active clamp flyback converter. In the FIG. 29(a) circuit the secondary choke has the same effect as a choke in series with the primary winding. As long as the choke is in series with the transformer the operation of the circuit is the same. In the FIG. 29(a) circuit the reset capacitor is returned to the negative terminal of the input source so that when the main switch is turned off the current from the source will be continuous and continue its path from input positive terminal to input negative terminal by the alternate path passing through the reset capacitor and auxiliary switch. The capacitor connection of FIG. 29(a) has the effect of providing an integral input filter with a ZVS drive mechanism.

Figure 30:
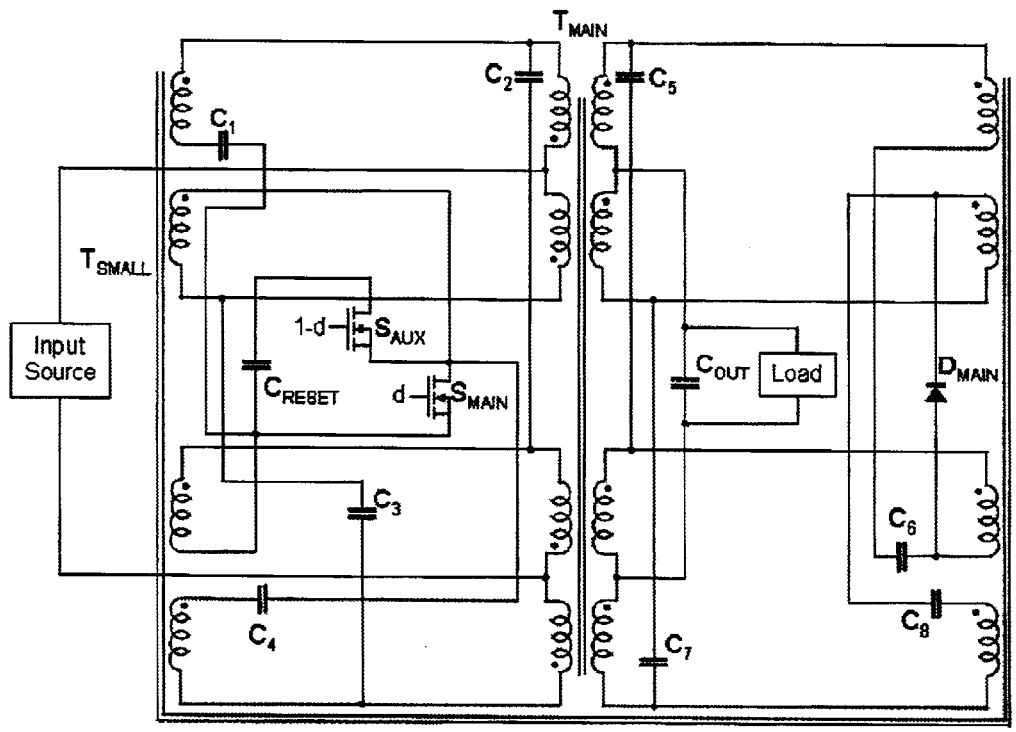
FIG. 30 illustrates an electromagnetic compatibility enhanced version of the FIG. 29(b) circuit formed by applying a known synthesis method to achieve common mode noise cancellation and ripple current cancellation at both input and output terminals.
Figure 31:
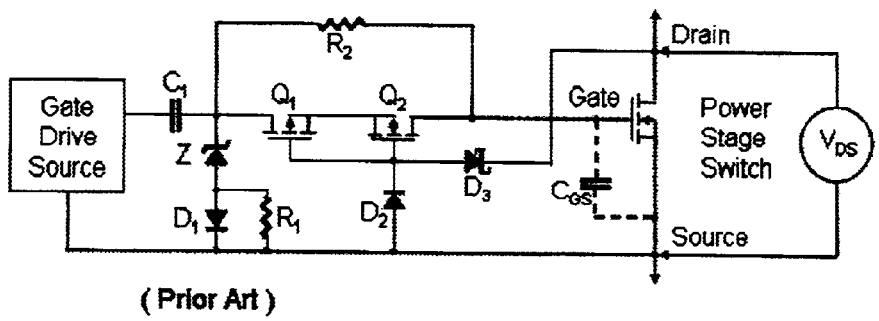
FIG. 31 illustrates a prior art adaptive gate drive circuit for ZVS switches that provides optimal gate drive timing for energy sufficient turn on transitions.
Figure 32:
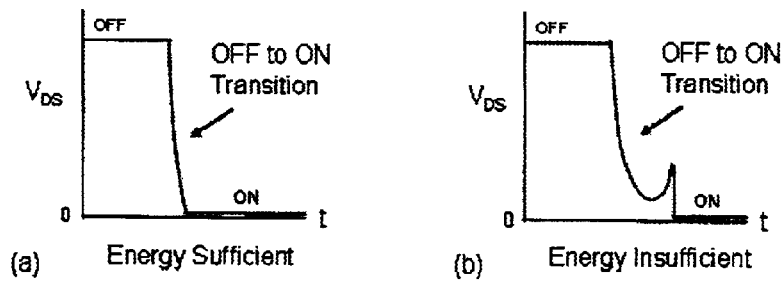
FIG. 32(a) illustrates the switch voltage wave form for an energy sufficient transition using the FIG. 31 circuit.
FIG. 32(b) illustrates the switch voltage wave form for an energy insufficient transition using the FIG. 31 circuit.

FIG. 29(b) has the same property of continuous input current as the FIG. 29(a) circuit, but the choke is now divided between the primary circuit and the secondary circuit. One of the advantages of dividing the choke between the primary side and the secondary side is that synthesis methods can be applied to the circuit with choke windings on both sides of the isolation boundary to achieve improved terminal current properties. An example of the application of a synthesis method to achieve improved terminal current properties is illustrated in FIG. 30. The FIG. 30 circuit requires one large magnetic and one small magnetic and achieves zero voltage switching, cancellation of common mode noise, and cancellation of ripple currents at both the input terminals and the output terminals.

Structure

The FIG. 33 circuit illustrates a gate drive control circuit that achieves optimal timing for ZVS turn on transitions, regardless of whether there is sufficient energy to drive the transition to zero volts or not. A source of gate drive energy with appropriate, but early, positive transition is provided. A first terminal of the gate drive source is connected to a first terminal of a coupling capacitor $C_1$. A second terminal of the coupling capacitor $C_1$ is connected to a cathode terminal of a zener diode. An anode terminal of the zener diode is connected to an anode terminal of a rectifier diode $D_1$ and to a first terminal of a bleed resistor $R_1$. A second terminal of the gate drive source is connected to a cathode terminal of diode $D_1$ and to a second terminal of resistor $R_1$. The second terminal of the gate drive source is also connected to a source terminal of a main N channel mosfet which serves as a power stage switch, to an anode terminal of a diode $D_2$, to an emitter of a NPN transistor $Q_3$, and to an anode terminal of a diode $D_4$. The second terminal of capacitor $C_1$ is also connected to a first terminal of a resistor $R_2$ and to a drain terminal of a P channel mosfet $Q_1$. A source terminal of mosfet $Q_1$ is connected to a source terminal of a mosfet $Q_2$. A gate terminal of mosfet $Q_1$ is connected to a gate terminal of mosfet $Q_2$, to a cathode terminal of diode $D_2$, to a collector terminal of transistor $Q_3$ and to an anode terminal of a diode $D_3$. A base terminal of transistor $Q_3$ is connected to a cathode terminal of diode $D_4$ and to a first terminal of a capacitor $C_2$. A second terminal of capacitor $C_2$ is connected to a cathode terminal of diode $D_3$ and to the drain terminal of the main N channel mosfet. The gate of the main N channel mosfet is connected to the drain terminal of mosfet $Q_2$ and to a second terminal of resistor $R_2$.

Operation

The operation of this circuit for the case in which there is sufficient energy in the drain circuit to drive the drain source voltage of the N channel mosfet to zero is described in a patent application whose serial number is 10/076,008. The reader is referred to the patent application for the energy sufficient case. For the energy insufficient case where the energy in the drain circuit drives the drain source voltage of the N channel mosfet to a minimum value greater than zero is described here. A turn on transition of the N channel mosfet is initiated when the gate drive source rapidly rises. As the gate drive source rises both terminals of capacitor $C_1$ rise and the drain voltage of the transistor $Q_1$ rises which forward biases the body diode of $Q_1$ forcing a rise in the source voltage of $Q_2$. When the source voltage of $Q_2$ rises the intrinsic gate source capacitance of $Q_2$ forces the gate voltages of $Q_1$ and $Q_2$ to rise too, since the diode $D_2$ prevents the charging of the gate source capacitance of $Q_2$. The voltage of the second terminal of $C_1$ is clamped by the zener diode Z. When the gate drive source rises the drain source voltage of the N channel mosfet begins to fall. As the drain voltage of the N channel mosfet falls both terminals of capacitor $C_2$ also fall, but the first terminal of capacitor $C_2$ is clamped to a voltage near the source terminal voltage of the N channel mosfet by the diode $D_4$ which is forward biased by capacitor $C_2$. When the drain voltage of the N channel mosfet reaches a minimum the current in the diode $D_4$ and the capacitor $C_2$ drops to zero and, as the drain voltage of the N channel mosfet begins to rise up, the voltage at the cathode of $D_4$ and the base of $Q_3$ rises, which forward biases the base emitter junction of transistor $Q_3$, which causes the gate voltage of transistors $Q_1$ and $Q_2$ to drop to the source voltage of the N channel mosfet. The drop in gate voltage of $Q_2$ enables $Q_2$ and $Q_1$, which results in current flow to the gate of the N channel mosfet, which turns the N channel mosfet on at the minimum value of the drain voltage of the N channel mosfet, as desired. There will be a slight delay in the turn on of the N channel mosfet due to the intrinsic gate resistance and gate source capacitance of the N channel mosfet.

Figure 34:
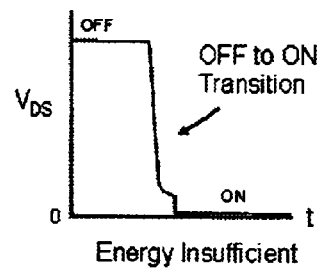
FIG. 34 illustrates the switch voltage wave form for an energy insufficient transition using the gate drive circuit of FIG. 33.

FIG. 34 illustrates the drain source voltage of the N channel mosfet during the turn on transition of the N channel mosfet using the gate drive circuit of FIG. 33. The FIG. 33 circuit uses a NPN transistor for $Q_3$ but a low threshold signal level N channel mosfet could also have been used for the $Q_3$ function, as illustrated in FIG. 87. In order to minimize the impact of the gate drive circuit on the operation of the power converter as a whole the smallest workable value for $C_2$ should be chosen. The effect of adding $C_2$ is the same as an increase in output capacitance of the N channel mosfet. Typically the minimum value for $C_2$ will be in the range of picofarads or tens of picofarads and the effect of $C_2$ on the power stage will be small.

Structure

A ZVS half bridge dc to dc transformer circuit according to the subject invention is revealed in FIG. 35. A positive terminal of an input source is connected to a first terminal of a switch $Q_1$ and to a first terminal of a capacitor $C_1$. A second terminal of switch $Q_1$ is connected to a first terminal of a switch $Q_2$, to a dotted terminal of a first primary winding of a transformer T, and to a dotted terminal of a second primary winding of transformer T. A second terminal of switch $Q_2$ is connected to a negative terminal of the input source and to a first terminal of a capacitor $C_2$. A second terminal of capacitor $C_2$ is connected to a second terminal of capacitor $C_1$, to an undotted terminal of the first primary winding of transformer T, and to an undotted terminal of the second primary winding of the transformer T. A dotted terminal of a first secondary winding of transformer T is connected to an anode terminal of a diode $D_1$. A dotted terminal of the first secondary winding of transformer T is connected to a first terminal of a capacitor $C_{OUT}$, to a first terminal of a load, and to a dotted terminal of a second secondary winding of transformer T. An undotted terminal of the second secondary winding of transformer T is connected to an anode terminal of a diode $D_2$. A cathode terminal of diode $D_2$ is connected to a cathode terminal of diode $D_1$, to a second terminal of capacitor $C_{OUT}$, and to a second terminal of the load.

Operation

The circuit has two on states separated by brief switching transitions. During a first on state switch $Q_1$ is closed and switch $Q_2$ is open. Current flows from the positive terminal of the source through $Q_1$ through both primary windings to the capacitors $C_1$ and $C_2$ and returns to the negative terminal of the source through $C_2$. During the first on state $C_2$ is being charged and $C_1$ is being discharged. The dotted terminals of each transformer winding is positive with respect to the negative terminals of each winding so the diode $D_1$ is forward biased and the diode $D_2$ is reverse biased so that current flows through the first secondary winding of transformer T through diode $D_1$ to the capacitor $C_{OUT}$ and to the load. During the first on state magnetizing current in the transformer T builds in the direction from dotted terminal to undotted terminal.

At the end of the first on state the switch $Q_1$ is opened and the magnetizing current and the energy stored in the magnetizing and leakage inductances in T forces the voltage across $Q_1$ to rise and the voltage across $Q_2$ to fall until the diode $D_2$ and the body diode of $Q_2$ begin to conduct and $Q_2$ is turned on at zero voltage. The turn on of the switch $Q_2$ marks the beginning of the second on state. During the second on state the current in the primary windings flows from undotted terminal to dotted terminal in the transformer T, diode $D_1$ is reverse biased, and the load current flows in diode $D_2$ and the second secondary winding of transformer T. During the second on state the capacitor $C_1$ is charged and the capacitor $C_2$ is discharged. During the second on state the magnetizing current in the transformer T reverses direction so that at the end of the second on state the magnetizing current flows from undotted terminal to dotted terminal in the transformer T.

At the end of the second on state the switch $Q_2$ is opened and the energy stored in the magnetizing and leakage inductances of transformer T force the voltage across the $Q_2$ switch to rise and the voltage across the $Q_1$ switch to fall until the diode $D_1$ and the body diode of switch $Q_1$ become forward biased at which time $Q_1$ can be turned on at zero voltage. When the switch $Q_1$ is turned on the first on state begins again and a full cycle of operation has been completed.

Figure 38:
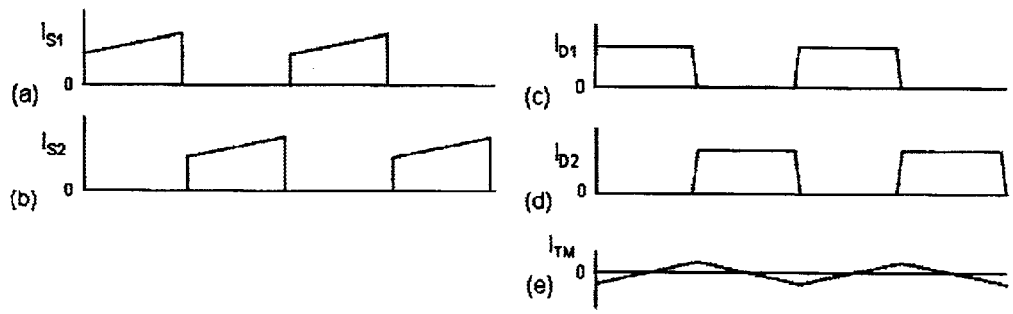
FIG. 38 illustrates the wave forms of the FIG. 35 circuit.

Wave forms illustrating operation of the FIG. 35 circuit are provided in FIG. 38.

Related Embodiments

Figure 36:
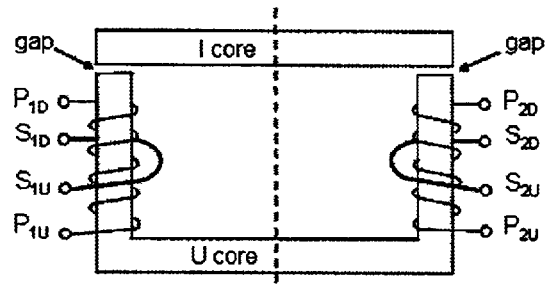
FIG. 36 illustrates a novel transformer suitable for use with the FIG. 35 circuit according to the subject invention.
Figure 37:
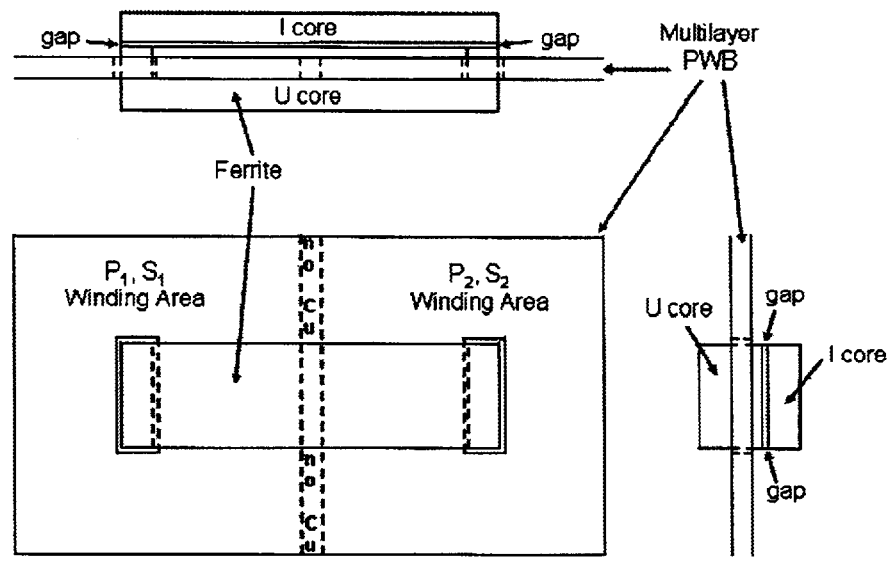
FIG. 37 illustrates a mechanical diagram of a planar transformer form of the FIG. 36 circuit.

FIG. 36 illustrates a U core transformer suitable for use with the circuit of FIG. 35. In the FIG. 36 circuit the first primary and secondary windings are placed on the left leg and the second primary and secondary windings are placed on the right leg of the U core, separating the two pairs of windings so that there will be tight magnetic coupling between the first primary and secondary windings, tight coupling between the second primary and secondary windings, but loose coupling between the first and second primary windings and loose coupling between the first and second secondary windings. In the U core structure of FIG. 36 the dotted line at the center of the core marks a division of the window area. The first primary and secondary windings are confined to the left of the dotted line and the second primary and secondary windings are confined to the right of the dotted lines thereby increasing the leakage inductance between first and second winding pairs. The leakage inductance between first and second winding pairs serves to force the primary currents to be unbalanced so that when the first secondary winding conducts the leakage inductance blocks current flow in the second primary winding so that the bulk of the primary current flows in the first primary winding. This is beneficial because current flow in the second primary winding creates eddy currents (and associated losses) in the second secondary winding which carries no load current while the first secondary winding is carrying the load current. FIG. 37 illustrates a mechanical drawing of a planar implementation of the FIG. 36 U core structure. FIG. 77 illustrates another planar implementation of the U core structure of FIG. 36 which provides additional magnetic material over the windings so that there will be better coupling between windings and core and lower coupling between first and second winding pairs. The FIG. 37 structure can be formed from standard U and I cores, whereas the FIG. 77 structure cannot be created from readily commercially available cores at the time of this writing.

Figure 39:
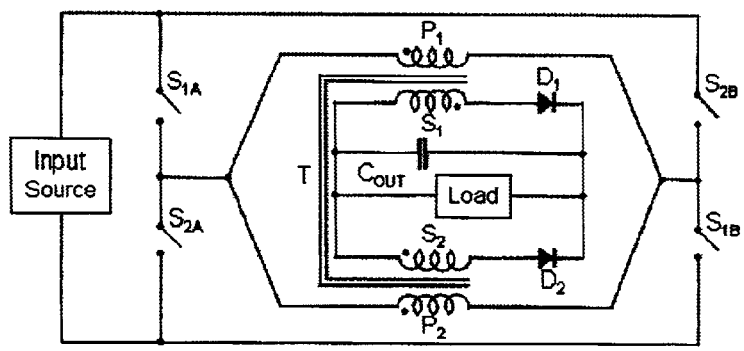
FIG. 39 illustrates a full bridge form of the dc to dc transformer of the subject invention.
Figure 40:
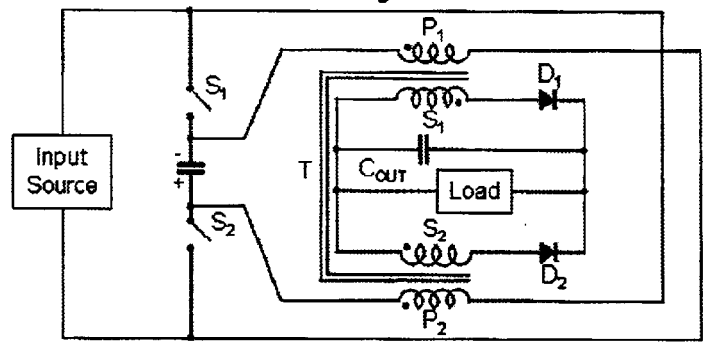
FIG. 40 illustrates a push pull form of the dc to dc transformer of the subject invention.
Figure 41:
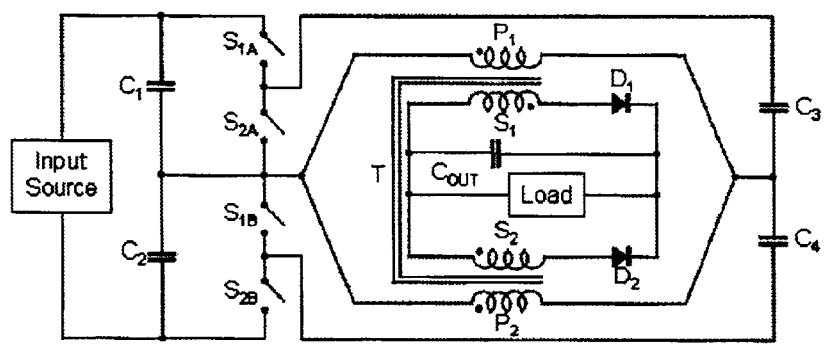
FIG. 41 illustrates a stacked half bridge form of the dc to dc transformer of the subject invention.
Figure 42:
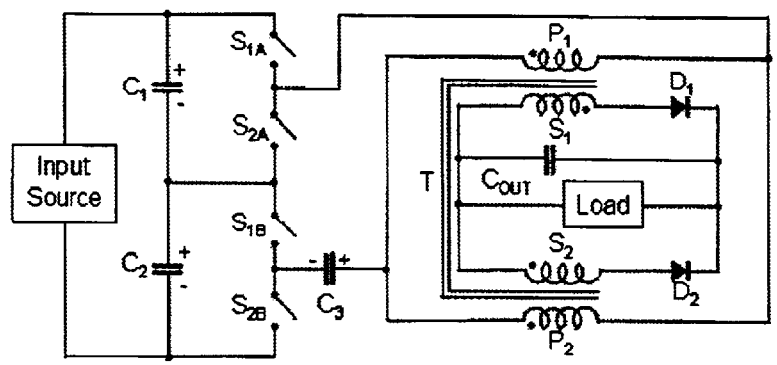
FIG. 42 illustrates a stacked full bridge form of the dc to dc transformer of the subject invention.
Figure 43:
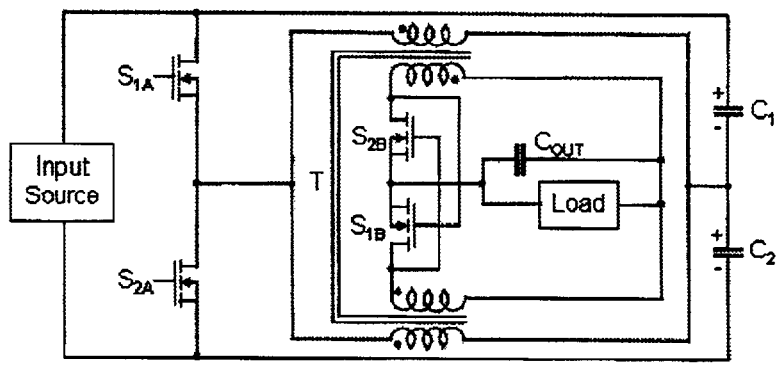
FIG. 43 illustrates a circuit similar to the FIG. 35 circuit but with self driven synchronous rectifiers.

FIG. 39 illustrates a full bridge implementation of the FIG. 35 circuit replacing the capacitor leg with another switch leg. In the FIG. 39 circuit switches $S_{1A}$ and $S_{1B}$ operate in synchronization and switches $S_{2A}$ and $S_{2B}$ operate in synchronization. FIG. 40 illustrates a push pull implementation of the FIG. 35 circuit, FIG. 41 illustrates a stacked half bridge implementation of the FIG. 35 circuit, and FIG. 42 illustrates a stacked full bridge implementation of the FIG. 35 circuit. FIG. 43 illustrates the FIG. 35 circuit implemented with self driven synchronous rectifiers instead of diode rectifiers. The synchronous rectifiers can potentially provide higher efficiency since there is no rectifier forward drop in the synchronous rectifiers. One general disadvantage of synchronous rectifiers is that gate drive energy must be provided to turn on and turn off the synchronous rectifiers. Synchronous rectifier self gate drive eliminates most of this disadvantage for the FIG. 43 circuit because, although gate drive energy is provided, the gate drive energy is not dissipated, but instead is recirculated in the secondary circuit of FIG. 43.

Structure

Figure 44:
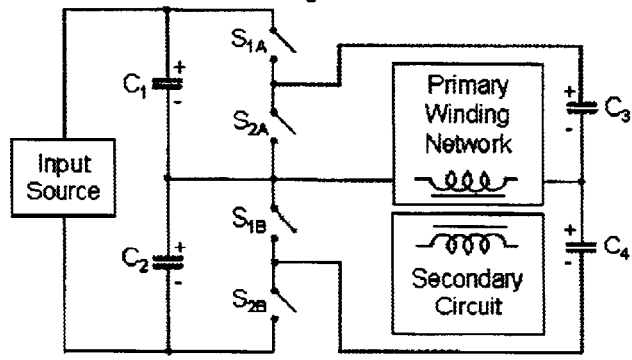
FIG. 44 illustrates a generalized stacked half bridge circuit according to the subject invention.
Figure 45:
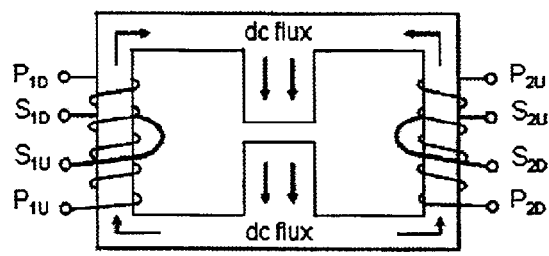
FIG. 45 illustrates an integrated magnetic circuit element based on a standard E core used in a prior art two phase power converter system with a high level of ripple current cancellation.
Figure 46:
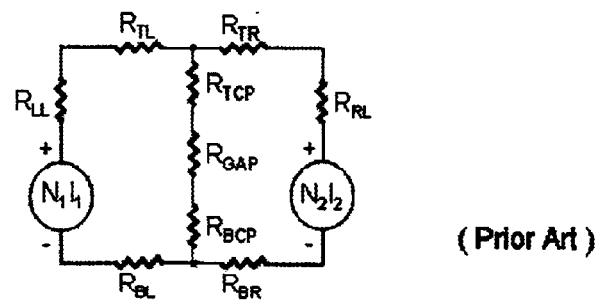
FIG. 46 illustrates the magnetic reluctance circuit for the FIG. 45 circuit element with the secondary windings omitted.
Figure 47:
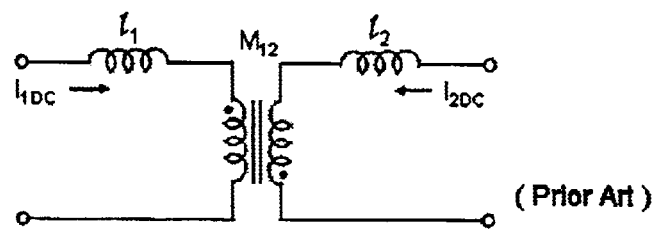
FIG. 47 illustrates an equivalent electrical circuit corresponding to the FIG. 46 magnetic circuit.
Figure 48:
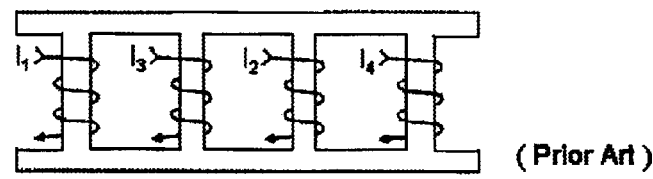
FIG. 48 illustrates a prior art ladder type integrated magnetic circuit element designed for a four phase power converter system.
Figure 49:
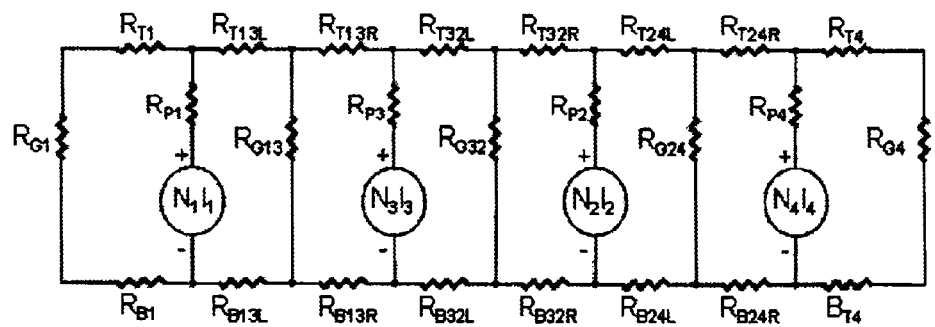
FIG. 49 illustrates the magnetic reluctance circuit corresponding to the FIG. 48 circuit element.

A stacked half bridge primary switching circuit is illustrated in FIG. 44. A positive terminal of an input source is connected to a first terminal of a capacitor $C_1$ and to a first terminal of a switch $S_{1A}$. A second terminal of capacitor $C_1$ is connected to a first terminal of a capacitor $C_2$, to a first terminal of a switch $S_{2A}$, to a first terminal of a switch $S_{1B}$, and to a first terminal of a primary winding network. A second terminal of capacitor $C_2$ is connected to a negative terminal of the source and to a first terminal of a switch $S_{2B}$. A second terminal of switch $S_{1A}$ is connected to a second terminal of switch $S_{2A}$ and to a first terminal of a capacitor $C_3$. A second terminal of capacitor $C_3$ is connected to a second terminal of the primary winding network and to a first terminal of a capacitor $C_4$. A second terminal of capacitor $C_4$ is connected to a second terminal of switch $S_{1B}$ and to a second terminal of switch $S_{2B}$. Magnetically coupled to the primary winding network is a secondary winding network which contains rectifiers and a load.

Operation

The motivation for the stacked half bridge switching network is to develop a low voltage for a primary winding network from a relatively high voltage source. In the subject invention the voltage applied to the primary winding network is one quarter of the input dc source voltage. During a first on state switches $S_{1A}$ and $S_{1B}$ are closed and switches $S_{2A}$ and $S_{2B}$ are open. The voltage applied to capacitors $C_1$ and $C_2$ is one half the input dc source voltage and the voltage applied to capacitors $C_3$ and $C_4$ is one quarter of the input dc source voltage, since the sum of the voltages applied to $C_3$ and $C_4$ must equal to the voltage applied to $C_1$ during the first on state. During the first on state the voltage applied to the primary winding network is equal to the voltage applied to the capacitor $C_4$ or one quarter of the input dc source voltage. At the end of the first on state the $S_{1A}$ and $S_{1B}$ switches are turned off and all four switches are off during a first off state. During a second on state the switches $S_{2A}$ and $S_{2B}$ are on and the other two switches are off. During the second on state the capacitors $C_3$ and $C_4$ are connected across $C_2$ and once again the voltage applied to the primary winding network is one quarter of the input dc source voltage, but the direction of the voltage applied to the primary winding network during the second on state is opposite to the direction applied during the first on state. At the end of the second on state a second off state, in which all four switches are off, begins. At the end of the second off state a new cycle beginning with a first on state begins. The operation of the subject switching network is similar to the operation of a half bridge or full bridge primary switching network except for the voltage applied to the primary winding network. For a half bridge the applied voltage is one half of the input dc source voltage, for a full bridge the applied voltage is equal to the input dc source voltage, and for the stacked half bridge of the subject invention the applied voltage is one quarter of the input dc source voltage. The stacked half bridge of the subject invention is useful for planar magnetic structures in which it is difficult to realize large numbers of primary turns because of minimum trace and spacing widths of printed circuit boards and a limited number of winding layers on which to place turns for a primary winding.

Structure

Figure 50:
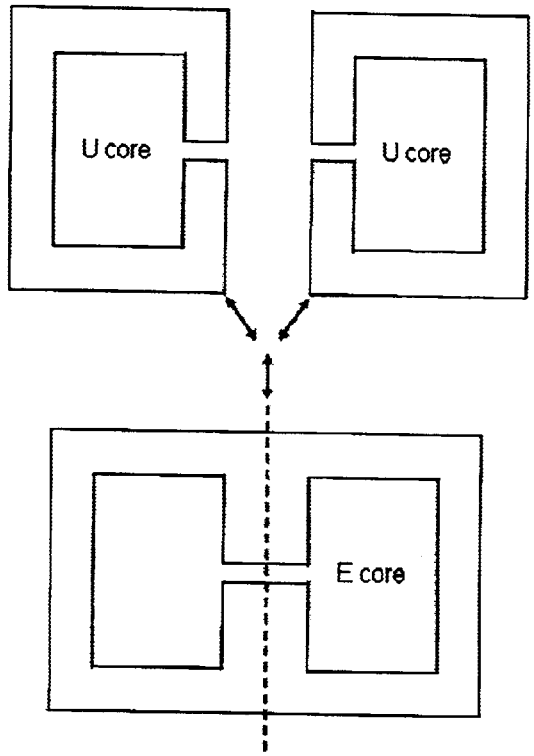
FIG. 50 illustrates how an E core can be formed from two U Cores.
Figure 51:
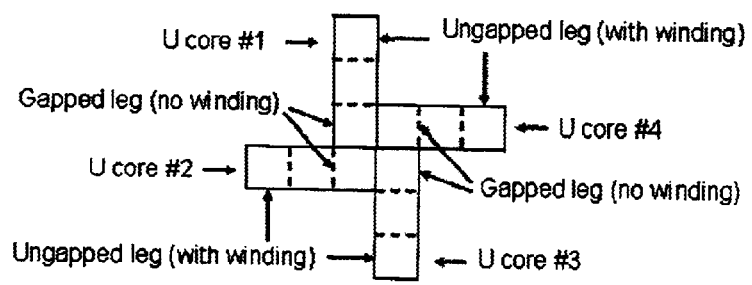
FIG. 51 illustrates how an integrated magnetic circuit element suitable for a four phase power converter with a high degree of ripple current cancellation can be formed from four U cores.
Figure 52:
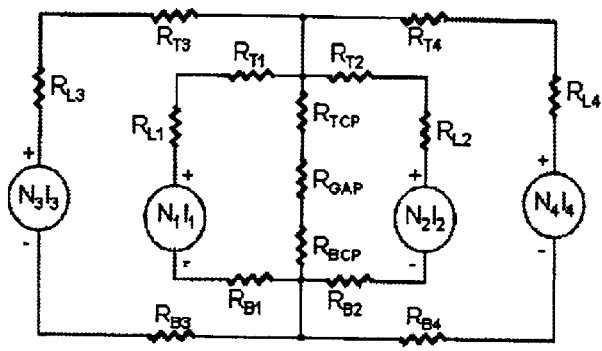
FIG. 52 illustrates a magnetic reluctance circuit diagram for the four U core integrated magnetic circuit element of FIG. 51.
Figure 53:
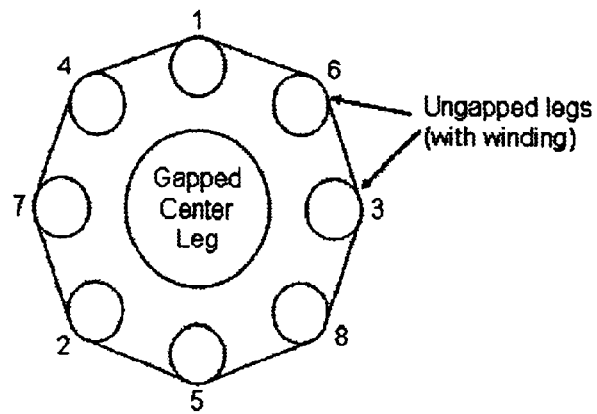
FIG. 53 illustrates an integrated magnetic structure for an eight phase power converter system.
Figure 54:
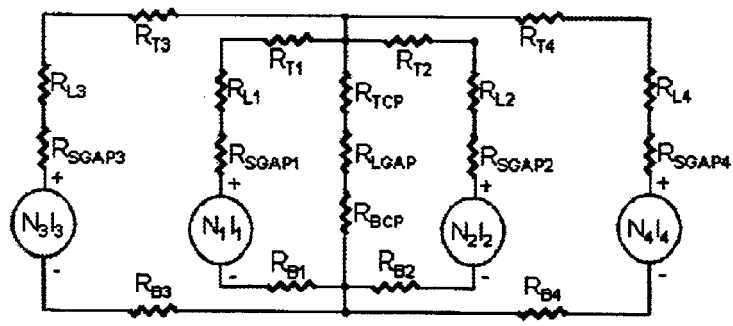
FIG. 54 illustrates a magnetic reluctance circuit diagram for the structure of FIG. 51 with small gaps in the winding leg of the U cores.
Figure 57:
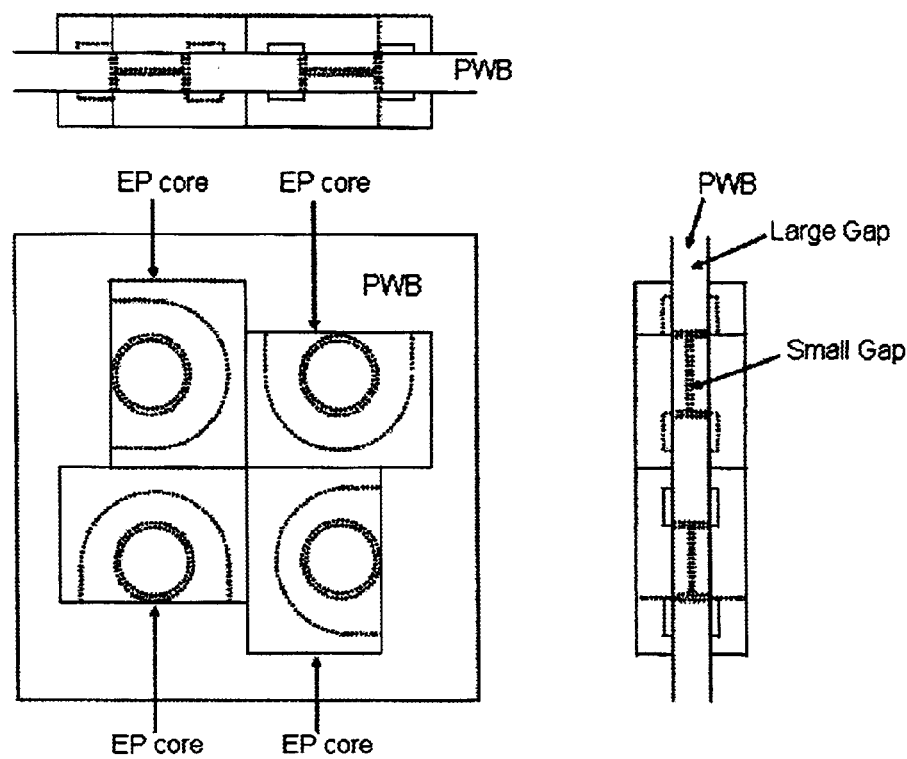
FIG. 57 illustrates a mechanical diagram of a structure similar to the FIG. 51 structure using four standard EP cores.
Figure 58:
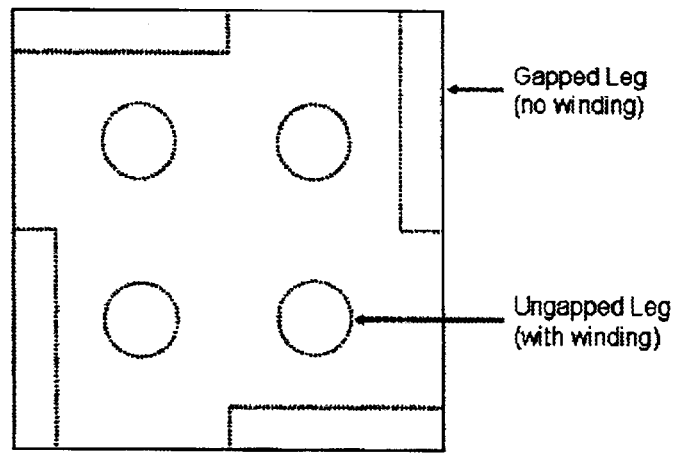
FIG. 58 illustrates a top mechanical view of a custom ferrite structure for optimal coupling of an integrated magnetic circuit element for a four phase power converter system.
Figure 59:
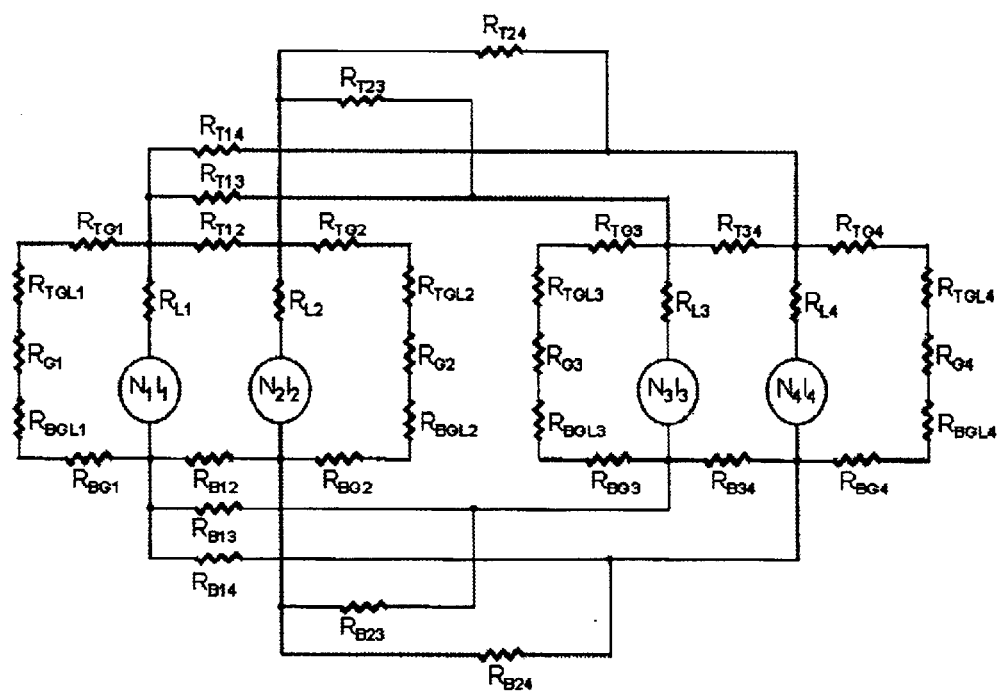
FIG. 59 illustrates a magnetic reluctance circuit diagram for the magnetic structure of FIG. 58.

As illustrated in FIG. 50 an E core with a gapped center leg can be formed from two identical U cores that are bonded together. The prior art has not shown this concept, but the prior art has shown that two magnetic elements of a two phase power converter system can be combined on an E core. The prior art has shown that when the two magnetic elements from the two phases are combined on an E core with the windings of each sub-converter on the outer legs of the E core with a single center leg gap then there is an improvement in the ripple performance. With the center leg gap and outer leg gaps there is a modest improvement in ripple performance, but the greatest ripple performance improvement occurs when there is only a center leg gap and no outer leg gaps so that the windings from the two sub-converters are tightly coupled. The coupling between the outer legs is high due to the fact that there is no air gap in the magnetic flux path connecting the two outer legs. The center leg provides a flux shorting path that tends to decouple the outer leg windings, but the center leg is gapped so that the shorting path is actually a relatively high reluctance path that guarantees a high degree of coupling between the outer leg windings. The effect of the high coupling between the outer leg windings is a high mutual inductance between the outer leg windings which forces both winding currents to be equal by rejecting (creating a high impedance to) difference currents. In the subject invention the concept of joining U cores to form an integrated composite core that has advantages for multi-phase converters is extended to multiple phases, as illustrated in FIG. 51. In the FIG. 51 embodiment four U cores are joined together to form a structure with a large common gapped center leg with four smaller ungapped outer legs, one leg per phase of the multi-phase converter. A magnetic reluctance circuit diagram of the structure is illustrated in FIG. 52. The FIG. 52 structure is a two dimensional structure that provides a direct low reluctance path between every conceivable pair of outer legs, and every conceivable pair of subconverters. The FIG. 52 structure is superior to other proposed structures in that it provides the same high degree of coupling between all winding pairs. The mutual coupling between windings of sub-converter pairs has the effect of balancing or equalizing the currents in the sub-converters thereby forcing the current in each phase of the multi-phase converter system to be more equal to each of the other currents of the other phases of the multi-phase converter system than would be the case without the mutual coupling. By forcing all of the sub-converter phase currents to be more equal the ripple currents in the subconverter switches will be reduced and the electromagnetic interference that results from ripple current is also reduced. FIG. 57 illustrates the formation of a four phase two dimensional core structure using standard commercially available EP cores. An EP core is not an E core but rather a U core of revolution with a round center post and only two legs. A true E core has three legs. FIG. 58 illustrates another two dimensional custom construction for four phases with four round legs for windings placed in closest proximity and four outer gapped legs. The FIG. 58 structure provides higher mutual coupling between windings by moving the gapped legs out of the magnetic flux paths that connect the winding legs. A magnetic reluctance circuit diagram for the FIG. 58 structure is illustrated in FIG. 59. Another two dimensional structure is illustrated for 8 phases in FIG. 53.

Figure 56:
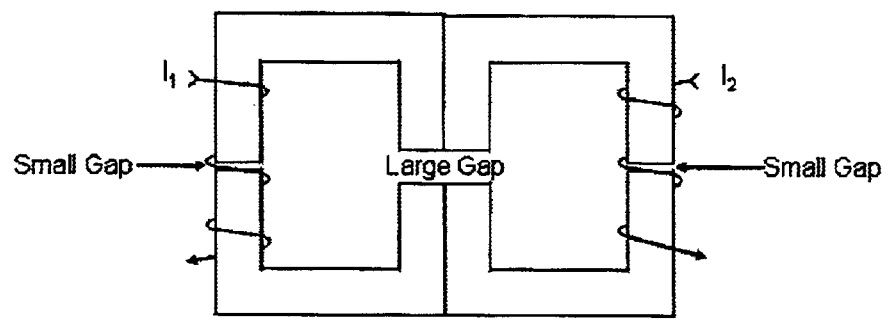
FIG. 56 illustrates an E core for a two phase power converter system with small winding leg gaps and a large gap in the center post for energy storage.

A big advantage to the reduced ripple is that the uncoupled inductance in each sub-converter can be reduced. The uncoupled inductance in each sub-converter determines the rate at which the current can change in response to a transient condition. With the subject highly coupled construction the uncoupled inductance can be reduced to a significantly smaller level than would be practical in an uncoupled construction thereby simultaneously achieving both low ripple current and fast transient response. Both the uncoupled inductance and the coupled inductance are related to the length of the center leg gap. Increasing the gap length increases the mutual coupling between winding pairs and decreases the uncoupled inductance. One of the biggest problems experienced by engineers designing multi-phase power converters is dc current balancing. Techniques that are used to achieve a high level of dc current matching include current mode control, current balancing circuits, and techniques that seek a high degree of duty cycle and component matching. In a structure that has a high mutual inductance, as proposed here, a relatively small difference current between phases may result in core saturation which can lead to catastrophic failure. Another method that can be used to reduce the likelihood of core saturation despite current differences is to place a small gap in the winding legs of the proposed structures. A winding leg gap is self defeating since placing a gap in the winding legs also reduces the mutual coupling. If other techniques to avoid current imbalance are not successful or cannot be used small winding leg gaps can be used to avoid core saturation. FIGS. 56 and 57 include a winding leg gap and the reader should be advised that although the figures illustrate a small gap the gap should be avoided, if at all possible. If the small gap cannot be avoided then the small gap should be minimized.

Operation

FIG. 52 illustrates a magnetic reluctance circuit diagram of the integrated composite core structure. We will assume that $N_1=N_2=N_3=N_4$. Suppose, for example, that current increases in the number 1 winding. The result of the increased current is a higher magnetomotive force (mmf) in the number 1 winding leg. The increased mmf results directly in increased magnetic flux in the number 1 winding leg. The flux created in the number 1 winding leg flows to the other legs of the magnetic circuit structure. The preferred paths are those with the smallest reluctance. All of the available paths have similar low magnetic reluctance due to the symmetry of the structure except the gapped leg which, because of the gap, has a relatively high reluctance. A small amount of flux will flow into the gapped leg and much larger amounts of flux will flow into the wound legs, numbers 2, 3, and 4, which have no gap, and, therefore, very low reluctance. The increase of flux in the other wound legs, numbers 2, 3, and 4, results in back electromotive forces (emfs), according to Faraday's Law, being generated in the windings attached to the other wound legs, which results in increased currents, induced currents, in each of the winding legs, except the number 1 winding leg. The induced currents in legs 2, 3, and 4, result in flux opposing the flux originating in the number 1 winding leg such that the flux in each leg mostly cancels the flux generated in the number 1 leg. The net effect of an increase in the current in one winding is an increase in the current in all windings and an increase in flux in the gapped leg, since the original current in leg number 1 and the induced currents in legs 2, 3, and 4 all serve to increase flux in the gapped leg. The direction of flux after the initial increase in the number 1 leg is flux flowing out of the number 1 leg and returning through all of the other legs. Although the increase in current in one leg of the structure is largely canceled in the other legs due to the induced currents, a very large increase in the current in leg number 1 can result in a significant increase in flux in the number 1 leg and can result in core saturation if care is not taken to avoid current imbalances between phases.

Figure 55:
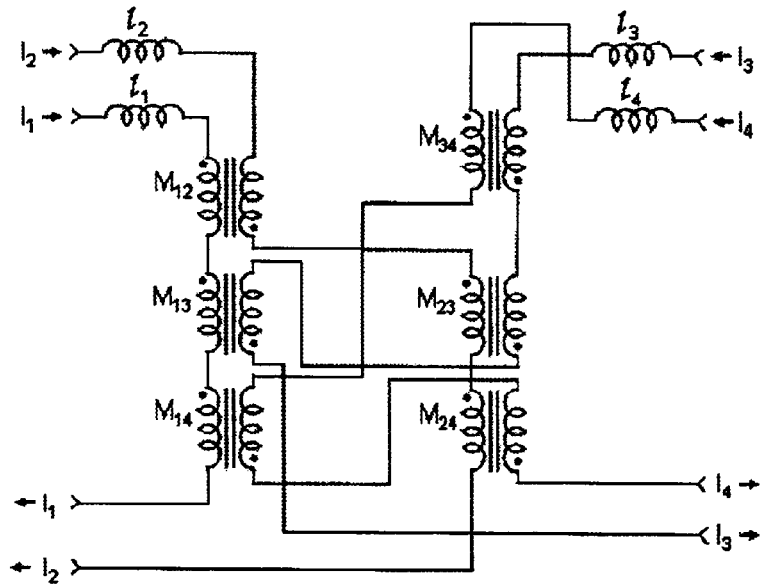
FIG. 55 illustrates an equivalent electrical circuit for the FIG. 51 magnetic structure assuming a single winding on each U core.

An equivalent electrical circuit diagram of the structure is illustrated in FIG. 55 assuming one winding per leg. The coupling coefficients for each of the mutual inductances are typically in the range of 30% to 33% since flux generated in the number 1 winding leg is distributed to four other legs including winding legs 2, 3, and 4, and the gapped leg. In a power converter circuit, such as a buck converter, as illustrated in FIG. 81, the currents in each winding will be either ramping up or ramping down depending on the state of the switches connected to the winding. The current ramp magnitude will also depend on the states of the switches connected to the other winding legs. If we assume that all of the current inputs are connected to a buck pair of switches and all of the current outputs are connected together to a common output capacitor and load, as illustrated in FIG. 81, the current ramp magnitudes will depend on states of all the switches and the magnitudes of the inductances and mutual inductances in the circuit. We can make some generalizations for describing and understanding the circuit behavior. Lets assume that all of the mutual inductances are equal to each other and all of the uncoupled inductances for each sub-converter are also mutually equal, but the inductance values of the mutual inductances is much larger than the inductance values of the uncoupled inductances. Referring to FIG. 55, suppose that the leg 1 and 2 windings are connected to the source positive terminal in a multi-phase buck converter, like the one in FIG. 81, while the leg 3 and 4 windings are connected to the source negative terminal or ground. The voltage applied to the $l_1$, $M_{12}$, $M_{13}$, and $M_{14}$ windings is equal to the difference between the input voltage and the output voltage, following the current path for sub-converter number 1. The applied voltage to the leg 1 winding would suggest that the dotted terminals of each of the mutual inductances, $M_{12}$, $M_{13}$, and $M_{14}$, is positive with respect to the negative terminals. For the leg 2 winding the applied voltage is also equal to the difference between the input voltage and the output voltage and is applied in the circuit diagram to the $l_2$, $M_{12}$, $M_{23}$, and $M_{24}$ windings. In the case of the number 2 winding leg the undotted terminal of the number 2 leg winding of the $M_{12}$ inductor is positive with respect to the dotted winding. For the $M_{12}$ inductor there is an apparent contradiction that is easily resolved by the realization that the winding voltages for the $M_{12}$ inductor must be zero. By a similar argument we can assert that the winding voltages for the $M_{34}$ inductor are also zero. We can extend the same argument to assert that if any two windings have the same applied voltages then the voltage applied to their mutual inductance is zero. For the current situation the winding voltages of four mutual inductances remain nonzero. The effect of each of these mutual inductances is to significantly reduce the applied voltage to the uncoupled inductance, since most of the winding voltage will appear across the much larger mutual inductances. The current ramp can be determined directly by knowing the voltage applied to the uncoupled inductance. Since that voltage is reduced by the mutual inductances we can argue that the current ramp is significantly reduced by comparison to the totally uncoupled case. If all of the windings are connected to the input positive, as might occur in response to a load transient that suddenly draws significantly more current from the output, then all of the mutual inductance winding voltages will be zero and the input to output difference voltage is applied to all of the uncoupled inductances in parallel so that the output current ramps up very quickly in response to the load transient. The claimed properties of the subject construction are low ripple current and fast transient response at the same time.

We can analyze the equivalent circuit of FIG. 55 assuming that the structure is used in a multi-phase buck converter which has the connections to input, load, and switches, as illustrated in FIG. 81. For each sub-converter we can write Kirchhoff's voltage loop equation. For the first subconverter we get $$V_1 = l_1 \cdot \frac{di_1}{dt} + M_{12} \cdot \frac{di_1}{dt} - M_{12} \cdot \frac{di_2}{dt} + \qquad (1)$$
$$M_{13} \cdot \frac{di_1}{dt} - M_{13} \cdot \frac{di_3}{dt} + M_{14} \cdot \frac{di_1}{dt} - M_{14} \cdot \frac{di_4}{dt},$$

where $V_1$ is the applied voltage to the winding for sub-converter number 1, which will be equal to the negative of the output voltage or the difference between the input voltage and the output voltage. We can simplify things considerably if we make some observations and reasonable assumptions. We will assume due to the symmetric structure that all of the mutual inductances are equal so that $M=M_{12}=M_{13}=M_{14}=M_{23}=M_{24}=M_{34}$, we will assume that the uncoupled inductance for each sub-converter is the same so that $L=l_1=l_2=l_3=l_4$, and we will assume that L is much smaller than M. We can simplify equation (1) using the assumptions to get $$V_1 = L \cdot \frac{di_1}{dt} + 3 \cdot M \cdot \frac{di_1}{dt} - M \cdot \frac{di_2}{dt} - M \cdot \frac{di_3}{dt} - M \cdot \frac{di_4}{dt}. \qquad (2)$$

We can write similar equations for each of the other sub converters. There is one other reasonable assumption we can make that will ease the analysis of the multi-phase system. Since the circuit structure is fully symmetric we will assume that the current slopes depend only on the states of the switches, so that if sub-converter number 1 and sub-converter number 2 have their switches connected to the input, then they will have the same current slope, so that if, in FIG. 81 for example, $S_{1U}$ is closed and $S_{2U}$ is closed, then we can assert that $$\frac{di_1}{dt} = \frac{di_2}{dt}.$$

Let us consider the situation in which sub-converter number 1 is connected to the input and the other three sub-converters are connected to ground. We will assert that $$\frac{di_2}{dt} = \frac{di_3}{dt} = \frac{di_4}{dt} \neq \frac{di_1}{dt}.$$

We will write equation (2) for sub-converter number 1 and for sub-converter number 2 and solve for the current slopes to see if the analysis predicts what we have asserted above. For sub-converter number 1

$$V_I - V_O = L \cdot \frac{di_1}{dt} + 3 \cdot M \cdot \frac{di_1}{dt} - 3 \cdot M \cdot \frac{di_2}{dt} \qquad (3)$$

and for sub-converter number 2

$$-V_O = L \cdot \frac{di_2}{dt} + 3 \cdot M \cdot \frac{di_2}{dt} - M \cdot \frac{di_1}{dt} - 2 \cdot M \cdot \frac{di_2}{dt} = \qquad (4)$$
$$L \cdot \frac{di_2}{dt} + M \cdot \frac{di_2}{dt} - M \cdot \frac{di_1}{dt},$$

where $V_I$ is the input voltage and $V_O$ is the output voltage. We solve equations (3) and (4) to get $$\frac{di_1}{dt} = \frac{V_I - V_O}{L + 4 \cdot M} + \frac{M \cdot (V_I - 4 \cdot V_O)}{L \cdot (L + 4 \cdot M)} \qquad (5)$$

and $$\frac{di_2}{dt} = \frac{-V_O}{L + 4 \cdot M} + \frac{M \cdot (V_I - 4 \cdot V_O)}{L \cdot (L + 4 \cdot M)} \qquad (6)$$

For uncoupled sub-converters we would have $$\frac{di_1}{dt} = \frac{V_I - V_O}{L} \text{ and } \frac{di_2}{dt} = \frac{-V_O}{L}.$$

We can see that the first terms in equations (5) and (6) are much smaller than the current ramp slopes for the uncoupled case. The second term is the same for both sub-converters. The second term is zero for the case where the output voltage is one quarter of the input voltage. The situation described in equations (5) and (6) is possible in the steady only for duty cycles in the range of greater than zero to less than 50%, which corresponds to output voltages in the range of zero to one half of the input voltage. The greatest ripple slopes will occur due to the second term in equations (5) and (6) for output voltages furthest removed from the cancellation output voltage of one quarter of the input voltage. The worst cases (highest ripple slopes) occur for the condition described when the output voltage is zero or when the output voltage is one half. When the output voltage is zero the second term becomes $$\frac{M \cdot V_I}{L \cdot (L + 4 \cdot M)}.$$

We can simplify this expression by using the fact that $L + 4 \cdot M \approx 4 \cdot M$, so that the second term approximates to $$\frac{V_I}{4 \cdot L},$$

or approximately one quarter of the slope of the uncoupled case. For the case where the output voltage is half the input voltage the second term approximates to $$\frac{-V_I}{4 \cdot L}.$$

At the extremes of duty cycle for the condition when one of the four sub-converters is in the on state and the other three sub-converters are in the off state the second term of the current ramp expressions dominates. Another consideration here is that for the extremes of duty cycle for the subject condition the fraction of the time that the system experiences the condition is very small. The current ramp slope has a low minimum value for the subject condition when the output voltage is one quarter of the input voltage and the current ramp increases in magnitude as the output voltage gets farther away from the point where the output voltage is one quarter of the input voltage.

Consider the condition in which two of the sub-converters are in the on state and two of the sub-converters are in the off state. Lets assume that, referring to FIG. 81, switches $S_{1U}$, $S_{2U}$, $S_{3L}$, and $S_{4L}$ are on and the other switches are off. We can assert that $$\frac{di_1}{dt} = \frac{di_2}{dt}$$

and that $$\frac{di_3}{dt} = \frac{di_4}{dt}$$

since the sub-converters are identical to each other. The simplified Kirchhoff's loop equations for sub-converters 1 and 3 are:

$$V_I - V_O = L \cdot \frac{di_1}{dt} + 2 \cdot M \cdot \frac{di_1}{dt} - 2 \cdot M \cdot \frac{di_3}{dt} \quad (7)$$

and $$-V_O = L \cdot \frac{di_3}{dt} + 2 \cdot M \cdot \frac{di_3}{dt} - 2 \cdot M \cdot \frac{di_1}{dt}. \quad (8)$$

Solving equations (7) and (8) we get $$\frac{di_1}{dt} = \frac{V_I - V_O}{L + 4 \cdot M} + \frac{2 \cdot M \cdot (V_I - 2 \cdot V_O)}{L \cdot (L + 4 \cdot M)} \quad (9)$$

and $$\frac{di_3}{dt} = \frac{-V_O}{L + 4 \cdot M} + \frac{2 \cdot M \cdot (V_I - 2 \cdot V_O)}{L \cdot (L + 4 \cdot M)}. \quad (10)$$

The first terms are the same as the previously described condition but for the subject condition of two sub-converters in the on state and two sub-converters in the off state the second term is different. Now we see that the second term is zero when the output voltage is one half of the input voltage. This second condition applies for duty cycles ranging from 25% to 75% and as with the previous condition the second term is largest at the duty cycle extremes. For the subject condition the maximum approximate absolute value for the second term at the duty cycle extremes is $$\frac{V_I}{4 \cdot L},$$

the same as for the previous condition. The second term is positive for the case when the duty cycle is less than 50% and negative when the duty cycle is greater than 50%.

Now consider the condition in which three sub converters are in the on state and one converter is in the off state so that $$\frac{di_1}{dt} = \frac{di_2}{dt} = \frac{di_3}{dt}.$$

The simplified Kirchhoff's loop equations for the subject condition are:

$$V_I - V_O = L \cdot \frac{di_1}{dt} + M \cdot \frac{di_1}{dt} - M \cdot \frac{di_4}{dt} \quad (11)$$

and $$-V_O = L \cdot \frac{di_4}{dt} + 3 \cdot M \cdot \frac{di_4}{dt} - 3 \cdot M \cdot \frac{di_1}{dt}. \quad (12)$$

The solution to the equations (11) and (12) is:

$$\frac{di_1}{dt} = \frac{V_I - V_O}{L + 4 \cdot M} + \frac{M \cdot (3 \cdot V_I - 4 \cdot V_O)}{L \cdot (L + 4 \cdot M)} \quad (13)$$

and $$\frac{di_4}{dt} = \frac{-V_O}{L + 4 \cdot M} + \frac{M \cdot (3 \cdot V_I - 4 \cdot V_O)}{L \cdot (L + 4 \cdot M)}. \quad (14)$$

This solution is the same as the previous two cases except that the second term changes sign and becomes zero at a duty cycle of 75%. The maximum approximate absolute value for the second term, $$\frac{V_I}{4 \cdot L},$$

is identical to the previous cases.

The only other possible conditions apply to the conditions in which all of the sub-converters are in the on state or all of the sub-converters are in the off state. These conditions are regular occurrences for duty cycles greater than 75% or less than 25% and are likely to occur whenever there is a large transient condition, regardless of the steady state duty cycle. For the case in which all of the sub-converters are in the on state or all of the sub-converters are in the off state $$\frac{di_1}{dt} = \frac{di_2}{dt} = \frac{di_3}{dt} = \frac{di_4}{dt}.$$

The Kirchhoff's voltage loop equation for each sub-converter is the same:

$$V_I - V_O = L \cdot \frac{di_1}{dt}. \quad (15)$$

The solution to equation (15) is the same as the uncoupled case, $$\frac{di_1}{dt} = \frac{V_I - V_O}{L}. \quad (16)$$

For the condition in which all of the sub-converters are in the off state the Kirchhoff's voltage loop equation becomes $$-V_O = L \cdot \frac{di_1}{dt} \quad (17)$$

and the solution is $$\frac{di_1}{dt} = \frac{-V_O}{L}, \quad (18)$$

which is the same as the uncoupled case. For the cases in which the sub-converters are either all on or all off the analysis is identical to the uncoupled condition so that the performance should be the same as for an uncoupled system with the same uncoupled inductance. In general we have shown that the current ramps are significantly reduced by comparison to the uncoupled case. Rather than achieve lower current ramp slopes and lower current ripple we can alternatively reduce the amount of uncoupled inductance to achieve the same current ripple performance with lower uncoupled inductance so that for transient conditions in which either all sub-converters are in the on state or all sub-converters are in the off state we can achieve much larger current ramp slopes and faster corrective action to the transient condition.

Structure

The benefits that accrue from the structure of the integrated composite core structure, as illustrated in FIGS. 51 and 57, of the previous embodiment can be achieved without an integrated magnetic. The equivalent electrical circuit of the integrated composite core structure was illustrated in FIG. 55. Similar electrical equivalent circuits can be realized with simpler standard core structures that yield similar performance results. An example of a multi-phase buck sub converter of the subject invention is illustrated in FIG. 78. A positive input terminal is connected to a first terminal of a switch $S_{NU}$. A second terminal of switch $S_{NU}$ is connected to a first terminal of a switch $S_{NL}$ and to either a dotted terminal of a first winding of a coupled inductor $L_{NM}$ with uncoupled inductance $L_N$ or to a first terminal of an inductor $L_N$ placed in series with the first winding of the coupled inductor $L_{NM}$. An undotted terminal of the first winding of the coupled inductor $L_{NM}$ is connected to an undotted terminal of a second winding of the coupled inductor in a different sub-converter of the multi-phase buck converter. A dotted terminal of a second winding of the coupled inductor is connected to an output positive terminal. A second terminal of the switch $S_{NL}$ is connected to a negative input terminal and a negative output terminal. An undotted terminal of the second winding of the coupled inductor is connected to an undotted terminal of a first winding of a coupled inductor in a sub converter that is different from the subject sub converter and different from the sub-converter to which the first winding of the coupled inductor is connected. The structure and connection process of the subject sub-converter is repeated for each sub-converter in the multi-phase system. A circuit diagram of a four phase converter system constructed as herein described is illustrated in FIG. 80. The winding structure of the FIG. 80 circuit is similar to the winding circuit of FIG. 55, but two of the coupled inductors are missing in the FIG. 80 circuit. The other two coupled inductors can be added as illustrated in the FIG. 81 circuit, if desired, to achieve a multi-phase converter system that is identical to the system based on the composite core structure described above. In the FIG. 80 circuit the uncoupled inductances are discrete inductances. FIG. 79 illustrates a similar circuit in which the uncoupled inductances are realized by the leakage inductances of the coupled inductors. Circuits of the FIG. 79 type can be built for any number of sub-converters using one coupled inductor per sub-converter. Additional coupled inductors can be added as shown in the FIG. 81 example for full symmetry at added cost. For the FIG. 81 example, the number of coupled inductors required is equal to $$\sum_{i=1}^{N-1} i,$$

where N is the number of sub-converters. For example the number of coupled inductors required for 3 sub-converters is 3, for 4 sub-converters, 6 coupled inductors are required, and for 5 sub-converters 10 coupled inductors are required.

Operation

The operation of the FIG. 80 circuit will be considered. We will assume that the coupling between first and second windings of the coupled inductors is large and that the value of the mutual inductances are much larger than the values of the uncoupled inductances. We will also assume that each sub-converter is identical except in their connections to the other sub-converters. For a first state of the system we will assume that the switches $S_{1U}$, $S_{2L}$, $S_{3L}$, and $S_{4L}$ are on and the switches $S_{1L}$, $S_{2U}$, $S_{3U}$, and $S_{4U}$ are off. Every winding of every coupled inductor is either connected directly to the output or indirectly through another winding to the output so that the winding voltage polarity of each winding can be determined by the connection to the output and to a switch which conducts current to either the positive input terminal or the negative input terminal. With $S_{1U}$ on, the dotted terminals of the $L_{14}$ windings are forced positive with respect to the undotted terminals and the undotted terminals of the $L_{13}$ windings are forced high. The undotted terminals of the $L_{13}$ windings are also forced low because the switch $S_{2L}$ is on. For the case of the $L_{13}$ coupled inductor it will effectively be out of the circuit for the current condition except for its contribution to the uncoupled inductance.

For purposes of analysis lets assume that all of the coupled inductors in FIG. 80 are identical and that all of the uncoupled inductances in each sub-converter are identical. Let the total uncoupled inductance along any sub-converter current path be L, and let the mutual inductance of each coupled inductor be M. We will assume that the states of the switches are as described above. For the subject condition with sub-converter 1 in the on state and the other 3 sub-converters in the off state we can say that $$\frac{di_3}{dt} = \frac{di_4}{dt}.$$

For the number 1 sub-converter we can write Kirchhoff's voltage loop equation:

$$V_I - V_O = L \cdot \frac{di_1}{dt} + 2 \cdot M \cdot \frac{di_1}{dt} - 2 \cdot M \cdot \frac{di_3}{dt} \quad (19)$$

For the number 2 sub-converter $$-V_O = L \cdot \frac{di_2}{dt} + 2 \cdot M \cdot \frac{di_2}{dt} - 2 \cdot M \cdot \frac{di_3}{dt} \quad (20)$$

and for the number 3 sub-converter $$-V_O = L \cdot \frac{di_3}{dt} + 2 \cdot M \cdot \frac{di_3}{dt} - M \cdot \frac{di_1}{dt} - M \cdot \frac{di_2}{dt}. \qquad (21)$$

Note that the number 2 sub-converter does not couple directly to the number 1 sub-converter in FIGS. 79 and 80, but the coupling for the sub-converters 3 and 4 is identical, i.e. they both couple to sub-converters 1 and 2, but not to each other. The solutions to equations (19) through (21) are:

$$\frac{di_1}{dt} = \frac{L \cdot (V_I - V_O) + M \cdot (4 \cdot V_I - 6 \cdot V_O)}{(L+2 \cdot M) \cdot (L+4 \cdot M)} + \frac{2 \cdot M^2 \cdot (V_I - 4 \cdot V_O)}{L \cdot (L+2 \cdot M) \cdot (L+4 \cdot M)} \qquad (22)$$

$$\frac{di_2}{dt} = \frac{-V_O \cdot (L+6 \cdot M)}{(L+2 \cdot M) \cdot (L+4 \cdot M)} + \frac{2 \cdot M^2 \cdot (V_I - 4 \cdot V_O)}{L \cdot (L+2 \cdot M) \cdot (L+4 \cdot M)} \qquad (23)$$

$$\frac{di_3}{dt} = \frac{-V_O}{L+4 \cdot M} + \frac{2 \cdot M^2 \cdot (V_I - 4 \cdot V_O)}{L \cdot (L+2 \cdot M) \cdot (L+4 \cdot M)}. \qquad (24)$$

The current ramps for the case with one sub-converter in the on state and 3 sub-converters in the off state appear similar in many ways to the composite core structure described above. In each case the second term drops out for duty cycle equal to 25% and at the worst case duty cycle extremes the magnitude of the second term approximates to $$\frac{V_I}{4 \cdot L},$$

as in the case for the composite core structure. The first terms of each current ramp slope for equations (22) through (24) has a $M^{-1}$ dependence so these terms are small by comparison to the uncoupled case and they are smaller than the second term of the expressions except near the duty cycles where the second terms are zero. In this case of separated cores another factor is that the coupling coefficients are larger, typically in the range of 95% to 99% so that the first terms are likely smaller than the composite core case considering the $M^{-1}$ dependence. Since we know that M is much larger than L we can assert that the first terms of the current ramp slopes must have significantly smaller magnitudes by comparison to the uncoupled case. The results here are very similar to the results for the composite core case.

The equations and the solutions for the cases in which two sub-converters or three sub-converters are in the on state is similar to the equations and solutions for the composite core structure described above. We have shown the high level of similarity for the case in which one sub-converter is in the on state and the other three sub-converters are in the off state. We can conclude that, for practical purposes, the circuit behaviors are the same and the results and conclusions which we can form from the analyses are the same.

For the conditions in which either all of the sub-converters are in the on state or all of the sub-converters are in the off state the magnetic coupling effectively disappears, as described above for the composite core structure so that all that is left is the uncoupled inductance and the behavior is the same as the uncoupled conditions.

The magnetically coupled multi-phase power converter system of the subject invention provides superior ripple current performance compared to the uncoupled case and equivalent performance compared to the composite core solutions, however, additional windings are required by comparison to the composite core solution, but standard cores with simple windings can be used. The outstanding ripple performance enables a designer to reduce the uncoupled inductance significantly to achieve both very fast transient response and improved ripple performance.

The user has some discretion about which sub-converters to connect to which other sub-converters. The best performance is achieved when sub-converters with 180 degrees of phase difference are coupled. If 180 degrees is not an option then sub converters that are as close as possible to 180 degrees of phase difference should be coupled.

FIG. 81 illustrates a circuit similar to the circuits of FIGS. 79 and 80 which adds two coupled inductors so that each of the sub-converters is directly magnetically coupled to every one of the other sub-converters. The describing equations for the FIG. 81 circuit are identical to the those for the composite core structure described above.

FIG. 82 illustrates a multi-phase boost converter according to the subject invention. FIG. 83 illustrates a buck sub-converter cell that achieves continuos input and output current and common mode noise cancellation according to the subject invention. A four phase converter system based on the sub-converter cells of FIG. 83 is illustrated in FIG. 84. FIG. 85 illustrates a flyback sub-converter cell according to the subject invention. FIG. 86 illustrates a four phase sub-converter system based on the flyback sub-converter cell of FIG. 85.

Structure

FIG. 60 illustrates a ZVS switching cell which when substituted for the main rectifier in a hard switching power converter with a single main switch and single main rectifier yields a similar power converter with soft switching. In power converters that contain the new switching cell first order switching losses of the main switch and rectifier reverse recovery effects are eliminated. Some variations of the new switching cell also integrate a filter with the ZVS cell thereby improving both converter efficiency and electromagnetic compatibility. The ZVS cell of FIG. 60 can be combined with a main switch and main inductor to form ZVS versions of the standard buck, boost, and buck boost converters, as illustrated in FIG. 61 and Table 1. A buck version of the subject invention is illustrated in FIG. 62.

An input source 200 positive terminal is connected to a node 213. The node 213 is connected to a first terminal of capacitor 208, to a first terminal of a switch 203, and to a cathode terminal of a diode 206. A second terminal of capacitor 208 is connected to a node 214. The node 214 is connected to a second terminal of switch 203, to an anode terminal of diode 206, to a first terminal of an inductor 201, to a first terminal of an inductor 202, to a first terminal of a capacitor 209, to a first terminal of a switch 204, and to a cathode terminal of a diode 207. A second terminal of inductor 201 is connected to a cathode terminal of a diode 205. An anode terminal of diode 205 is connected to a node 216. Node 216 is connected to a negative terminal of source 200, to a first terminal of a capacitor 210, to a first terminal of a capacitor 211, and to a first terminal of a load 212. A second terminal of capacitor 209 is connected to a node 215. Node 215 is connected to a second terminal of switch 204, to an anode terminal of diode 207, and to a second terminal of capacitor 210. A second terminal of inductor 202 is connected to a node 217. Node 217 is connected to a second terminal of capacitor 211 and to a second terminal of load 212.

Operation

An on state of the converter is illustrated in FIG. 64. During the on state switch 203 is closed and switch 204 is open. During the on state current flows from the input source through the switch 204 through the inductor 202 to the output and the load. FIG. 63 illustrates wave forms of the circuit's operation. At the end of the on state the switch 203 is opened, as illustrated in FIG. 65, and the inductor 202 current is transferred into capacitors 208, 209, and 210. Capacitor 210 is assumed to be large by comparison to the capacitors 208 and 209 so that the voltage on capacitor 210 is invariant. The inductor 202 current forces the capacitor 208 to charge and the capacitor 209 to discharge. While capacitor 209 is discharging, diode 205 becomes forward biased and begins to conduct, as illustrated in FIG. 66. Capacitor 209 continues to discharge until the diode 207 becomes forward biased, as illustrated in FIG. 67. Soon after diode 207 begins to conduct switch 204 is turned on at zero voltage, as illustrated in FIG. 68. FIG. 68 represents the off state of the converter. During the off state the inductor 202 current ramps down and the current in inductor 201 ramps up. During the off state the current in switch 204 begins equal to the peak inductor 202 current and ramps down to zero current and continues to ramp down until the switch 204 current is equal in magnitude, but opposite in direction, to the peak inductor 202 current. During the off time the current in inductor 201 ramps up to the inductor 202 current and continues to ramp up until at the end of the off state the current in the inductor 201 is equal to the current in the inductor 202 plus the peak inductor 202 current. At the end of the off state the switch 204 is opened, as illustrated in FIG. 69. The current in the inductor 201 forces the capacitor 209 to charge and the capacitor 208 to discharge, until the diode 206 becomes forward biased, as illustrated in FIG. 70. Soon after diode 206 becomes forward biased the switch 203 can be turned on at zero voltage. For a short time after switch 203 is turned on the diode 205 remains on as the current in the inductor 201 ramps down to zero at which point a new on state begins, as illustrated in FIG. 64, and a new cycle of operation begins.

A buck implementation of the subject invention implemented with mosfet switches is illustrated in FIG. 71. An alternative buck implementation that incorporates an integral input filter is illustrated in FIG. 89. The FIG. 89 circuit achieves elimination of first order switching losses, elimination of diode reverse recovery effects, and continuous (non-pulsating) input terminal current for improved electromagnetic compatibility.

FIG. 72 illustrates a boost implementation of the subject invention with the active reset network connected to the output terminal. A non-pulsating output terminal current version of the FIG. 72 circuit can be achieved by connecting the reset capacitor to the output negative terminal rather than the output positive terminal.

FIG. 73 illustrates a buck boost or non-isolated flyback implementation of the subject invention. FIG. 90 illustrates a variation of the FIG. 73 circuit that achieves non-pulsating input and output terminal currents. FIG. 74 is an isolated flyback implementation of the subject invention that uses the switching cell of FIG. 60, but not the generalized converter structure of FIG. 61.

Conclusions, Ramifications, and Scope of Invention

Thus the reader will see that the circuits and the circuit elements of the subject invention provide solutions that improve circuit efficiency and circuit performance.

While my above description contains many specificities and candidate circuits to which the ZVS cells, gate drivers, magnetic circuit elements, and multi-phasing methods can be applied, these should not be construed as limitations on the scope of the invention, but rather as exemplifications or preferred embodiments thereof. Many other variations are possible. Many known power conversion circuits to which the ZVS cells, gate drive techniques, magnetic circuit elements, and multi-phasing methods can be applied were not included herein as candidate circuits to which they are applicable. The large number of examples included herein should be considered as proof of the universal applicability of the circuits, circuit elements, and methods. Previously unknown improved circuits that can be formed by application of these circuits, circuit elements, and methods to known circuits should be considered as embodiments of this invention. For example, dc to dc converters similar to those shown but which have alternate capacitor connections yielding similar converters with equivalent AC wave forms but different dc capacitor voltages, dc to dc converters, similar to those shown in the drawings, but where the dc input source is instead a varying rectified AC signal, converters with multiple isolated outputs, converters employing IGBTs and bipolar power transistors rather than mosfets as the power stage switches, cascaded converters containing multiple connected conversion networks of the type revealed here, converters in which the output is an AC voltage with a frequency less than the switching frequency of the power conversion network, converters similar to those described here but with load, line, or ground connections reversed. Accordingly, the scope of the invention should be determined not by the embodiments illustrated, but by the appended claims and their legal equivalents.

I claim:

1. A zero voltage switching cell comprising,
   a first cell terminal,
   a coupled inductor having a primary winding and a secondary winding with a dotted terminal of said primary winding of said coupled inductor connected to said first cell terminal,
   a rectifier having first and second terminals with said first terminal of said rectifier connected to an undotted terminal of said primary winding of said coupled inductor,
   a second cell terminal connected to said second terminal of said rectifier,
   an active reset network having a first terminal and a second terminal with said first terminal of said active reset network connected to a dotted terminal of said secondary winding of said coupled inductor and with said second terminal of said active reset network connected to an undotted terminal of said coupled inductor, comprising a series connection of,
      a capacitor, and
      switch means, operable substantially in synchronization with said rectifier, being on when said rectifier is on and being off when said rectifier is off, except for timing variations at the switching transitions, which timing variations are sufficiently long to enable a transition of said switch means from a non-zero applied voltage in an off state to zero applied volts,
   whereby said zero voltage switching cell, when substituted for the main rectifier in a hard switching power converter circuit having a single main switch, a single main rectifier, and a main dc magnetic energy storage element, provides zero voltage switching for said single main switch by using energy stored in said coupled inductor to drive a zero voltage turn on transition for said single main switch.

2. A zero voltage switching cell comprising,
   an auxiliary coupled inductor having at least first and second windings, a main switch network having a first terminal and a second terminal comprising,
 said first winding of said auxiliary coupled inductor having a dotted terminal and an undotted terminal with said undotted terminal of said first winding of said auxiliary coupled inductor connected to said first terminal of said main switch network,
 first switch means having a first terminal and a second terminal with said first terminal of said first switch means connected to said dotted terminal of said first winding of said auxiliary coupled inductor and with said second terminal of said first switch means connected to said second terminal of said main switch network,
a main rectifier network having a first terminal and a second terminal comprising,
 said second winding of said auxiliary coupled inductor having a dotted terminal and an undotted terminal with said undotted terminal of said second winding of said auxiliary coupled inductor connected to said first terminal of said main rectifier network,
 second switch means, operable substantially in anti-synchronization to said first switch means, being off when said first switch means is on and being on when said first switch means is off, except for timing variations at the switching transitions, which timing variations are sufficiently long to enable a transition of said second switch means from a non-zero applied voltage in an off state to zero applied volts and sufficiently long to enable a transition of said first switch means from a non-zero applied voltage in an off state of said first switch means to zero applied volts, having a first terminal and a second terminal with said first terminal of said second switch means connected to said dotted terminal of said second winding of said auxiliary coupled inductor and with said second terminal of said second switch means connected to said second terminal of said main rectifier network,
an active reset network having a first terminal and a second terminal with said first terminal of said active reset network connected to a dotted terminal of said auxiliary coupled inductor and with said second terminal of said active reset network connected to an undotted terminal of said auxiliary coupled inductor comprising a series connection of,
 a capacitor, and
 third switch means, operable substantially in anti-synchronization to said first switch means, being off when said first switch means is on and being on when said first switch means is off, except for timing variations at the switching transitions, which timing variations are sufficiently long to enable a transition of said third switch means from a non-zero applied voltage in an off state of said third switch means to zero applied volts and sufficiently long to enable a transition of said first switch means from a non-zero applied voltage in an off state of said first switch means to zero applied volts,
whereby said main switch network, when used in place of a main switch in a power converter containing a single main switch, a single main rectifier and a main magnetic circuit element which stores dc energy during a part of its operating range, and said main rectifier network, when used in place of said main rectifier in said power converter, together with said active reset network form a zero voltage switching cell in which energy stored in said auxiliary coupled inductor is used to drive a zero voltage turn on transition of said first switch means.

3. The zero voltage switching cell of claim 2 with said auxiliary coupled inductor further comprising a third winding having a dotted terminal and an undotted terminal.

4. The zero voltage switching cell of claim 3 wherein said first terminal of said active reset network is connected to said dotted terminal of said third winding of said auxiliary coupled inductor and said second terminal of said active reset network is connected to said undotted terminal of said third winding of said auxiliary coupled inductor.

5. A zero voltage switching power converter comprising,
an input having two terminals coupleable to a source of dc power,
an output having two terminals coupleable to a load,
a first coupled inductor having a primary winding and a secondary winding with said primary winding coupleable to a terminal of said input and with said secondary winding coupleable to a terminal of said output,
a second coupled inductor having a primary winding and a secondary winding with said primary winding of said second coupled inductor connected in series with said primary winding of said first coupled inductor and with said secondary winding of said second coupled inductor connected in series with said secondary winding of said first coupled inductor,
first switch means for applying a source of dc power connected at said input to said series connected primary windings,
second switch means, operable substantially in anti-synchronization to said first switch means, for applying said series connected secondary windings to a load connected at said output terminals,
an active reset network having a first terminal and a second terminal with said first terminal of said active reset network connected to said first switch means and with said second terminal of said active reset network connected to a terminal of said input, comprising a series arrangement of,
 a capacitor, and
 third switch means, operable substantially in anti-synchronization to said first switch means,
whereby magnetic energy stored in said second coupled inductor is used to drive a zero voltage turn on transition of said first switch means.

6. The zero voltage switching power converter of claim 5 further comprising a diode having a first terminal and a second terminal with said first terminal of said diode connected to a terminal of said input and with said second terminal of said diode connected to said primary winding of said first coupled inductor and to said primary winding of said second coupled inductor whereby said diode clamps the voltage applied to said primary winding of said first coupled inductor to a voltage no greater than the voltage applied to the input terminals plus a forward voltage of said diode.

7. A zero voltage switching power converter comprising,
an input coupleable to a source of dc potential having two terminals,
an output coupleable to a load having two terminals,
first switch means connected to a terminal of said input,
a main rectifier network having two terminals, one of which terminals is connected to a terminal of said output, comprising a series connection of,
 second switch means operable substantially in anti-synchronization to said first switch means, and
 a first inductor, an active reset network having a first terminal and a second terminal, with said first terminal of said active reset network connected to a terminal of said main rectifier network, comprising a series connection of,
   third switch means operable substantially in anti-synchronization to said first switch means, and
   a capacitor,
a second inductor, connected to said first switch means, said main rectifier network, and to said active reset network,
whereby said first inductor provides energy to drive a zero voltage turn on transition of said first switch means.

8. The zero voltage switching power converter of claim 7 wherein said second inductor is a coupled inductor having both a primary winding and a secondary winding with said first switch means connected to said primary winding of said second inductor and with said main rectifier network connected to said secondary winding of said second inductor.

9. The power converter of claim 7 wherein said active reset network is connected to a terminal of said input in parallel with said first switch means thereby providing an effective integral filter and non-pulsating input terminal current.

* * * * *